US009288526B2

(12) United States Patent
Spears

(10) Patent No.: US 9,288,526 B2
(45) **Date of Patent: *Mar. 15, 2016**

(54) METHOD AND SYSTEM FOR DELIVERY OF CONTENT OVER COMMUNICATION NETWORKS

(71) Applicant: IPAR, LLC, San Francisco, CA (US)

(72) Inventor: Joseph L. Spears, Hayward, CA (US)

(73) Assignee: IPAR, LLC, San Francisco, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/307,840

(22) Filed: Jun. 18, 2014

(65) Prior Publication Data

US 2014/0294365 A1 Oct. 2, 2014

Related U.S. Application Data

(63) Continuation of application No. 12/930,787, filed on Jan. 18, 2011, now Pat. No. 8,781,304.

(51) Int. Cl.

| | |
|---|---|
| ***H04N 5/76*** | (2006.01) |
| ***H04N 21/4147*** | (2011.01) |
| ***H04N 5/782*** | (2006.01) |
| ***H04N 9/82*** | (2006.01) |

(Continued)

(52) U.S. Cl.

CPC .......... *H04N 21/4147* (2013.01); *H04N 5/782* (2013.01); *H04N 9/8227* (2013.01); *H04N 21/4334* (2013.01); *H04N 21/4532* (2013.01); *H04N 21/47214* (2013.01); *H04N 21/485* (2013.01); *H04N 21/6581* (2013.01); *H04N 21/6582* (2013.01); *H04N 21/812* (2013.01)

(58) Field of Classification Search

CPC .......... H04N 21/4334; H04N 21/4582; H04N 21/4147; H04N 5/00; H04N 5/782

See application file for complete search history.

(56) References Cited

U.S. PATENT DOCUMENTS

| | | | |
|---|---|---|---|
| 5,664,133 | A | 9/1997 | Malamud et al. |
| 5,737,527 | A | 4/1998 | Shiels et al. |

(Continued)

FOREIGN PATENT DOCUMENTS

| | | |
|---|---|---|
| WO | 2008-094616 A1 | 8/2008 |
| WO | 2010-131238 A1 | 11/2010 |

OTHER PUBLICATIONS

Mystrands, Inc.; Mystrands Discovery for Windows; www.mystrands.com; 2006.

(Continued)

*Primary Examiner* — Huy T Nguyen

(74) *Attorney, Agent, or Firm* — Jones Day

(57) ABSTRACT

Computer-implemented systems and methods for determining second content which was not selected by the user but which is related to first content which was selected by the user. For example, a system and method can be configured to receive, using one or more processors, first and second content where the first and second content are rich media (e.g., content containing audio or video elements). Systems and methods may be further configured where the relationship between the first content and second content are determined based on data or metadata of the first content (e.g., the title of the content or an episode number). Systems and methods may be further configured where the relationship between the first content and second content are determined based on scheduling data of the first content (e.g., the time and channel when the first content is transmitted).

66 Claims, 20 Drawing Sheets

300
104
Content Repository
301
Media Player processes content storage event for First Content
302
Media Player checks for availability of Second Content
320
Media Player stores First Content
311
Media Player retrieves Second Content
330
Media Player combines First and Second Content
350
Content Reported as Available
312
Media Player stores Second Content
331
Media Player stores Derivative Content

(51) Int. Cl.

| | |
|---|---|
| ***H04N 21/433*** | (2011.01) |
| ***H04N 21/45*** | (2011.01) |
| ***H04N 21/472*** | (2011.01) |
| ***H04N 21/485*** | (2011.01) |
| ***H04N 21/658*** | (2011.01) |
| ***H04N 21/81*** | (2011.01) |

(56) References Cited

U.S. PATENT DOCUMENTS

| | | | |
|---|---|---|---|
| 5,802,361 | A | 9/1998 | Wang et al. |
| 7,136,853 | B1 | 11/2006 | Kohda et al. |
| 7,464,058 | B2 | 12/2008 | Yen et al. |
| 7,806,329 | B2 | 10/2010 | Dmitriev et al. |
| 8,781,304 | B2 * | 7/2014 | Spears .................. H04N 5/782 386/297 |
| 2002/0120501 | A1 | 8/2002 | Bell et al. |
| 2002/0184314 | A1 | 12/2002 | Riise |
| 2003/0126607 | A1 | 7/2003 | Phillips et al. |
| 2004/0221310 | A1 | 11/2004 | Herrington et al. |
| 2005/0131762 | A1 | 6/2005 | Bharat et al. |
| 2006/0020596 | A1 | 1/2006 | Liu et al. |
| 2006/0235723 | A1 | 10/2006 | Millard |
| 2006/0278064 | A1 | 12/2006 | Lourdeaux |
| 2007/0073596 | A1 | 3/2007 | Alexander et al. |
| 2007/0106551 | A1 | 5/2007 | McGucken |
| 2007/0156594 | A1 | 7/2007 | McGucken |
| 2007/0169165 | A1 | 7/2007 | Crull et al. |
| 2007/0204308 | A1 | 8/2007 | Nicholas et al. |
| 2007/0214179 | A1 | 9/2007 | Hoang |
| 2007/0288308 | A1 | 12/2007 | Chen et al. |
| 2008/0034329 | A1 | 2/2008 | Posner et al. |
| 2008/0040475 | A1 | 2/2008 | Bosworth et al. |
| 2008/0066099 | A1 | 3/2008 | Brodersen et al. |
| 2008/0071688 | A1 | 3/2008 | Corbett et al. |
| 2008/0090513 | A1 | 4/2008 | Collins et al. |
| 2008/0114750 | A1 | 5/2008 | Saxena et al. |
| 2008/0201225 | A1 | 8/2008 | Maharajh et al. |
| 2008/0235216 | A1 | 9/2008 | Ruttenberg |
| 2009/0037355 | A1 | 2/2009 | Brave et al. |
| 2009/0197681 | A1 | 8/2009 | Krishnamoorthy et al. |
| 2009/0199227 | A1 | 8/2009 | Kennedy |
| 2009/0217036 | A1 | 8/2009 | Irwin et al. |
| 2009/0240586 | A1 | 9/2009 | Ramer et al. |
| 2010/0058485 | A1 | 3/2010 | Gonzalez |
| 2010/0086283 | A1 | 4/2010 | Ramachandran et al. |
| 2010/0094878 | A1 | 4/2010 | Soroca et al. |
| 2010/0205628 | A1 | 8/2010 | Davis et al. |
| 2010/0263005 | A1 | 10/2010 | White |
| 2011/0145719 | A1 | 6/2011 | Chen et al. |
| 2011/0219394 | A1 | 9/2011 | Lueth et al. |
| 2011/0225609 | A1 | 9/2011 | Li et al. |
| 2011/0246574 | A1 | 10/2011 | Lento et al. |
| 2011/0265113 | A1 | 10/2011 | Apfel et al. |
| 2011/0289084 | A1 | 11/2011 | Fisher |
| 2012/0089996 | A1 | 4/2012 | Ramer et al. |
| 2012/0131171 | A1 | 5/2012 | Samuel et al. |
| 2012/0136812 | A1 | 5/2012 | Brdiczka |

OTHER PUBLICATIONS

Pereira, Fernando, Vetro, Anthony, Sikora, Thomas; Multimedia Retrieval and Delivery; Essential Metadata Challenges and Standards; Proceedings of the IEEE, 96(4); pp. 721-744; 2008.

International Search Report; PCT/US2011/022865; Apr. 2011.

Written Opinion of the International Searching Authority; PCT/US2011/022865; Apr. 2011.

Written Opinion of the International Searching Authority; PCT/US2011/022871; 2012.

Digital Video Broadcasting; Content Protection and Copy Management; pp. 1-103; 2005.

Muhlbauer, Adam, Safavi-Naini, Reihaneh, Salim, Farzad, Sheppard, Nicholas, Surminen, Martin; Location Constraints in Digital Rights Management; Computer Communications, Elsevier Science Publishers, 31(6); pp. 1173-1180; 2008.

Written Opinion of the International Searching Authority; PCT/US2011/022876; 2012.

Subramanya, S.R., Yi, Byung; Utility Model for On-Demand Digital Content; Computer, IEEE Service Center, vol. 38, 6(1); pp. 95-98; 2005.

International Search Report; PCT/US2011/022902; Apr. 2011.

Written Opinion of the International Searching Authority; PCT/US2011/022902; Apr. 2012.

PR Newswire; Press Release; Mar. 12, 2011.

Spears, Joseph; GMANE Article, Beginner Questions on Clustering & M/R; Jul. 15, 2010.

Spears, Joseph; GMANE Article, Recommending Items for Anonymous Users; Apr. 19, 2010.

International Search Report; PCT/US2012/047520; Dec. 2012.

Written Opinion of the International Searching Authority; PCT/US2012/047520; Dec. 2012.

International Search Report; PCT/US2011/022877; Oct. 2011.

Written Opinion of the International Searching Authority; PCT/US2011/022877; Oct. 2011.

* cited by examiner

METHOD AND SYSTEM FOR DELIVERY OF CONTENT OVER COMMUNICATION NETWORKS

CROSS-REFERENCE TO RELATED APPLICATIONS

This patent application is a continuation of U.S. patent application Ser. No. 12/930,787, filed Jan. 18, 2011, and entitled "System and Method for Augmenting Rich Media Content Using Multiple Content Repositories," the entirety of which is herein incorporated by reference.

TECHNICAL FIELD

The present disclosure relates generally to content distribution and more specifically to computer-implemented systems and methods for enabling augmenting content that has is traditionally delivered over a broadcast medium.

BACKGROUND

Traditional broadcast media (i.e., content bound for television or radio and delivered to its audience over channels such as terrestrial radio, satellite, coax or fiber-optic cable) is delivered within the context of a schedule (e.g., radio programming schedule, television broadcast schedule). By convention, each content item (e.g., television episode, movie, radio program) is scheduled to fit within a time slot that begins and ends on either the top or the bottom of the hour (e.g. 10:00 or 10:30). By conforming to this convention, broadcasters (i.e., companies that transmit or delivery broadcast media) can attract viewers in one time slot who were watching content from another broadcaster in another time slot.

Following the broadcast schedule convention allows viewers of broadcast content to experience tremendous amounts of fluidity in the way that their content is consumed. For instance, a viewer can consume content from multiple broadcasters in the same day. By conforming to this convention, the number of scheduling conflicts can be reduced to a discrete number of "time slots". Furthermore, by having multiple well defined time-slots, a broadcaster has the ability to deliver a very broad menu of content to all potential viewers.

Contrary to the existence of these time slots, the individual units of artistic expression (i.e., broadcast content) are sometimes produced in blocks larger than the time slots available for broadcast. Furthermore, many broadcasters require that broadcast content to be shortened into even smaller blocks (e.g., 22 minutes for a ½ hour slot and 44 minutes for an hour slot) so that interstitial advertisements (i.e., commercials) can be inserted into the content and make its delivery commercially viable for a broadcaster. Such discrepancy between the original runtime of the broadcast content and the time available in the broadcast schedule generally results in elements of the broadcast content being trimmed for delivery over the broadcast medium.

In order to overcome the limitations of the traditional broadcast schedule, creators of broadcast content often make additional content available to the broadcast audience by uploading additional media assets to a website or by republishing the additional media assets via alternate means (e.g., selling the show on a DVD or through an Internet media outlet). This approach requires the audience to perform additional, manual actions (e.g., go to a website, sign up for an account on an Internet media outlet, download files, buy a copy of the media asset that has been packaged for commercial sale) which is only performed by audiences for a percentage of the time. This approach is further limited because audiences often cannot perform the actions to get the additional media assets until a later time (e.g., when they are at a computer or at a store). This barrier to immediacy also reduces the percentage of the audience that finally gains access to the additional content.

With the broad availability of home media devices that can store broadcast content for later playback (e.g., VCRs, DVRs, home media centers, etc), audiences now have a way to consume broadcast outside of a pre-defined broadcast schedule. This allows the broadcast audience to begin the consumption of broadcast content at a time that is different than the time it was originally scheduled to be broadcast (e.g., by recording a TV show on one day and playing it on another, recording a movie that is playing in the afternoon while the viewer works so that it can be played when the viewer returns home in the evening, or scheduling a series of recordings to be played back when the audience member returns from vacation). Many of these home media devices offer other functions that allow the broadcast audience to fast-forward, replay or pause the broadcast content. Such functions allow the broadcast audience to cause the runtime of the runtime content to be modified from its original scheduled runtime. The result of such technologies allow audiences to no longer be constrained to the broadcast schedules while still having the ability to consume the broadcast content.

Even with the availability of home media devices, broadcast content continues to be delivered within the context of a broadcast schedule. This means that even though home media devices are available for storing content for consumption outside of a predefined schedule, that the content that is consumed remains in the format of a predefined schedule.

Additionally, a savvy Internet user may be able to find some content that is scheduled by their home media device to record but which is presented in another context (e.g., on a website, as part of a subscription service) at an earlier time or day than would be available to them through the use of their broadcast provider alone. In these cases, users should not be constrained to a broadcast schedule that unnecessarily delays delivery of content that they have selected.

Thus, what is needed in the art are systems and methods for empowering creators of broadcast content and broadcasters to deliver additional content to broadcast audiences who use home media devices. This delivery of additional content must be done in a way that removes barriers such as manual processing or lack of immediacy for the broadcast audience.

SUMMARY

The present disclosure addresses the need in the art. Systems and methods are provided for enabling users to interact with a second content which was retrieved based on the selection of a related, but different first content. Additionally, systems and methods are provided for allowing the second content to appear alongside, to supersede or to be combined with the first content.

In accordance with the teachings provided herein, systems and methods for determining second content which was not selected by the user but which is related to first content which was selected by the user. For example, a system and method can be configured to receive, using one or more processors, first and second content where the first and second content are rich media (e.g., content containing audio or video elements).

Systems and methods may be further configured where the relationship between the first content and second content are determined based on data or metadata of the first content (e.g., the title of the content or an episode number). Systems and methods may be further configured where the relationship between the first content and second content are determined based on scheduling data of the first content (e.g., the time and channel when the first content is transmitted).

Systems and methods may be further configured where the first and second content are available in different content repositories or in the same content repository.

Particular embodiments of the subject matter described in this specification can be implemented to realize one or more of the following advantages. Users can gain access to second content automatically once the first content is selected. Additionally, users can gain access to content that is of a higher quality or which is presented in an extended version as compared to their original selection. Given a plurality of potential content repositories, a search for second content among each of these content repositories can take place automatically without the user needing to be aware of the various content repositories or to take time searching the repositories manually.

The details of one or more embodiments of the invention are set forth in the accompanying drawings and the description below. Other features, aspects, and advantages of the invention will become apparent from the description, the drawings, and the claims.

DETAILED DESCRIPTION

Figure 1A:
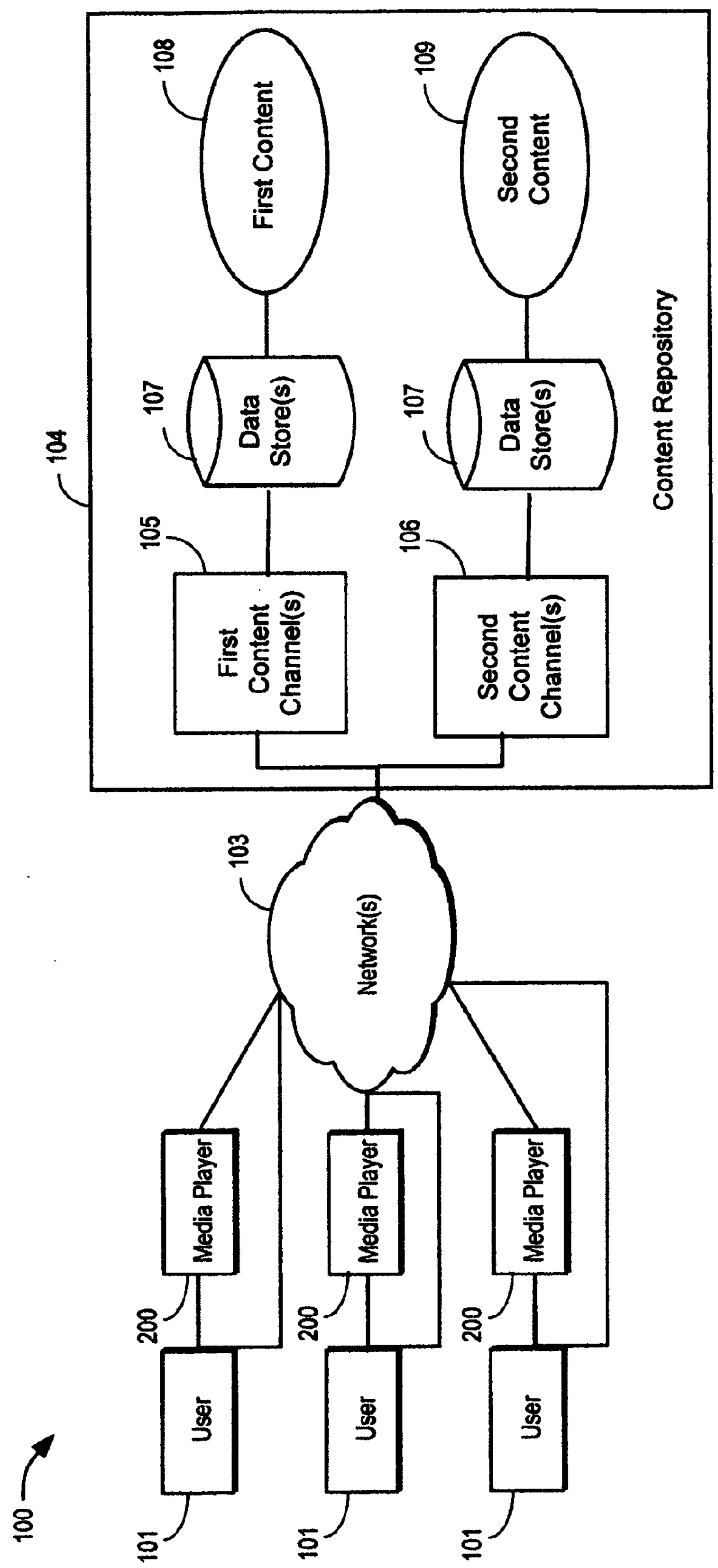
FIG. 1A shows a block diagram of an example system for delivery of content from a content repository to media players where a content repository contains separate defined channels for first content and second content.
Figure 1B:
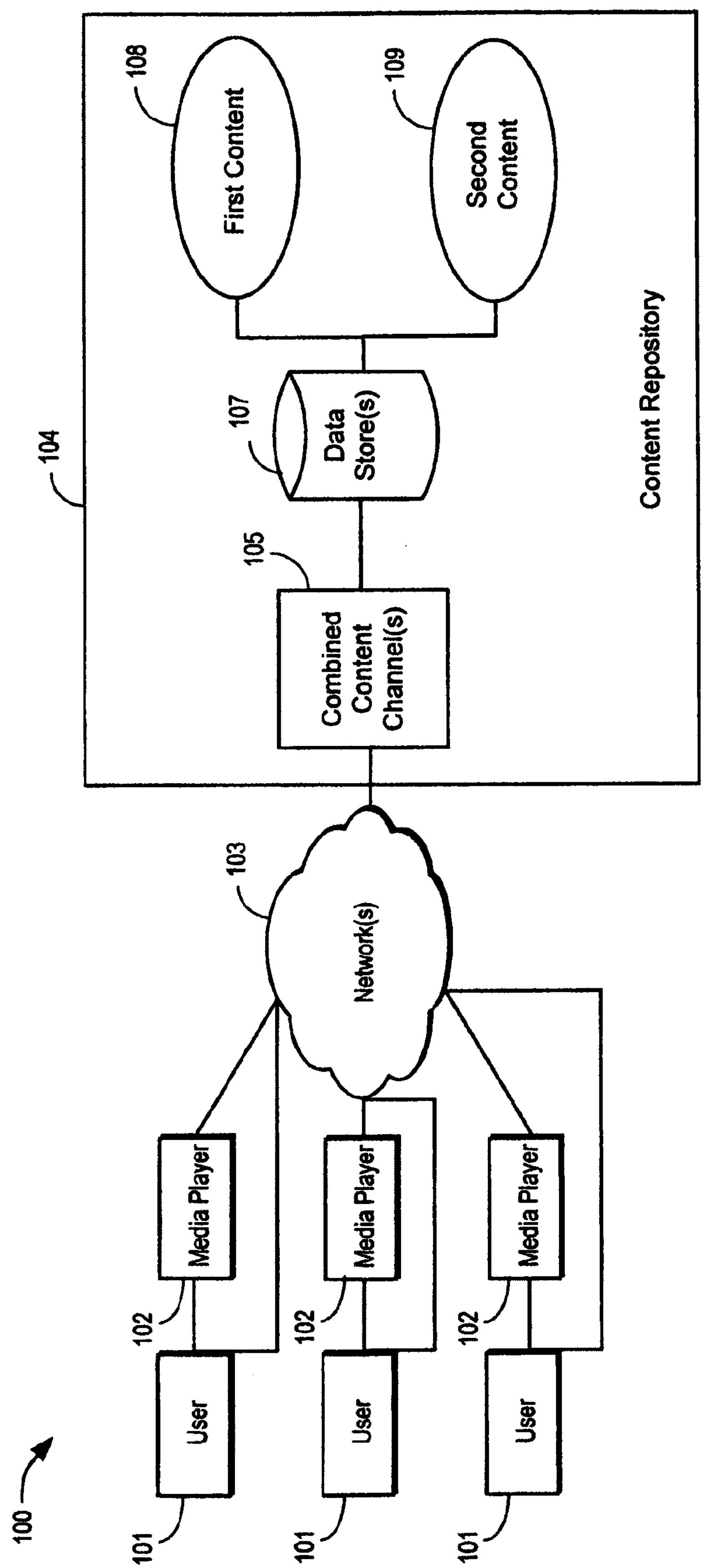
FIG. 1B shows a block diagram of an example system for delivery of content from a content repository to media players where a content repository contains combined channels) for first content and second content.

FIGS. 1A and 1B are block diagrams of example computer-implemented environments for allowing users to interact with a content repository. A content repository is a system that contains rich media (i.e., audio/video content such as movies, television shows, music, etc.) which is designed to deliver the rich media to users either as part of a broadcast or at the demand of the end user. First content in a content repository is content (i.e., either a single rich media item or a collection of rich media items) that has been selected by the user (e.g., as part of a scheduled recording, by selecting the frequency over which the content is being broadcast, purchasing the content from an pay-per-view service). Second content in a content repository is content that is different from, but related to the first content and which was not selected by the user (or in some cases, that the user is not even aware of its existence). In this content, second content is not an advertisement in and of itself but may contain advertising. In some implementations, second content can be deleted scenes, interviews with the cast and crew or outtakes. In some implementations, second content can be of a different format than the first content (e.g., where one content is audio-visual and the other is audio-only, where one content is a video and the other is a digital image or where the contents are encoded using different codecs). In some implementations, the second content can contain advertising. In some implementations, the advertising that has been inserted into the second content can be dynamically generated and tailored to the specific user to which the second content is delivered.

FIG. 1A shows a block diagram of an example system for delivery of content from a content repository to media players where a content repository contains separate defined channels for first content and second content. System 100 can be a computer implemented environment wherein one or more users 101 can interact with a content repository 104 containing a first content 108 and second content 109 through a media player 200 connected to a network 103. A media player 200 is a device or computed implemented environment such as one of the subsystems described at 200 in FIG. 2A, FIG. 2B, FIG. 2C or FIG. 2E.

The first content 108 is accessible by means of one or more first content channel(s) 105. A first content channel 105 is a system that provides the function of delivering first content 108. First content 108 can be stored in one or more data store(s) 107. In some implementations, the first content channel 105 can be a broadcast station (e.g., a television channel, cable channel, satellite channel). In some types of this implementation, the first content 108 can be analog or digital video content whose data store(s) 107 are represented by disks or tape. In other types of this implementation, the first content 108 can be digital video content whose data store(s) 107 are represented by storage devices connected to one or more servers that are themselves a component of the first content channel 105.

In some implementations, the first content channel 105 can be an open network endpoint (e.g., website, web service, streaming server, over-the-air television or radio station or a service that is available by connecting to a service endpoint over an open network). In some implementations, the first content channel 105 can be a closed network endpoint (e.g., a pay-per-view channel from a cable or satellite provider, video on demand service, a premium cable channel or a service that is available by connecting to a service endpoint on a closed network). An open network is a collection of interconnected devices that allow communication between devices with little, if any, authentication being applied (e.g., the Internet, a BBS, a private LAN, an unencrypted over-the-air television or radio broadcast). A closed network is a collection of interconnected devices that communicate either 1) on physically separate channels from open networks, or 2) within open networks but where communication signals are separated from other signals (often by employing specialized devices, cards or other equipment) by at least one of: a) out-of-band signals b) encryption c) authentication. In each of the previous two implementations, the first content 108 can be digital video content whose data store(s) 107 are represented by storage devices connected to one or more servers that are themselves a component of the first content channel 105.

The second content 109 is accessible by means of one or more second content channel(s) 106. A second content channel 106 is a system that provides the function of delivering second content 109. Second content 109 can be stored in one or more data store(s) 107. In some implementations, the second content channel 106 can be a broadcast station. In some types of this implementation, the second content 109 can be analog or digital video content whose data store(s) 107 are represented by disks or tape. In other types of this implementation, the second content 109 can be digital video content whose data store(s) 107 are represented by storage devices connected to one or more servers that are themselves a component of the second content channel 106.

In some implementations, the second content channel 106 can be an open network endpoint. In some implementations, the second content channel 106 can be a closed network endpoint. In each of the previous two implementations, the second content 109 can be digital video content whose data store(s) 107 are represented by storage devices connected to one or more servers that are themselves a component of the second content channel 106.

In some implementations, the first content channel 105 and the second content channel 106 may use similar means to deliver content (e.g., where both content channels are websites or where both content channels are cable-television channels). In other implementations, the first content channel 105 and the second content channel 106 may use different means to deliver content (e.g., where one content channel is an internet-based streaming-audio service and the other content channel is a satellite-radio station).

FIG. 1B shows a block diagram of an example system for delivery of content from a content repository to media players where a content repository contains combined channel(s) for first content and second content. System 100 can be a computer implemented environment wherein one or more users 101 can interact with a content repository 104 containing a first content 108 and second content 109 through a media player 200 connected to a network 103. A media player 200 is a device or computed implemented environment such as one of the subsystems described at 200 in FIG. 2A, FIG. 2B, FIG. 2C or FIG. 2E.

The first content 108 and second content 109 are both accessible by means of one or more combined content channel(s) 105. A combined content channel 105 is a system that provides the function of delivering both first content 108 and second content 109. First content 108 and second content 109 can be stored in one or more data store(s) 107. In some implementations, the combined content channel 105 can be a broadcast station (e.g., a television channel, cable channel, satellite channel). In some types of this implementation, the first content 108 or second content 109 can be analog or digital video content whose data stores) 107 are represented by disks or tape. In other types of this implementation, the first content 108 and second content 109 can be digital video content whose data store(s) 107 are represented by storage devices connected to one or more servers that are themselves a component of the combined content channel 105.

In some implementations, the combined content channel 105 can be an open network endpoint. In some implementations, the combined content channel 105 can be a closed network. In each of the previous two implementations, the first content 108 and second content 109 can be digital video content whose data store(s) 107 are represented by storage devices connected to one or more servers that are themselves a component of the combined content channel 105.

FIGS. 2A-2D are block diagrams of example systems for allowing playback of rich media content retrieved from a content repository. Numerous implementations of such systems exist in the form of Internet enabled video disk players, Digital Video Recorders (DVRs), audio tape recorders, television set-top boxes, internet TVs, media enabled video game consoles and television connected personal computers. Other implementations of these devices can be created in the future by any number of home entertainment device manufacturers. Although many of these devices (such as Internet enabled video disk players, media enabled video game consoles and television connected personal computers) have functionality that allows them to play content that was retrieved by means other than a network, such non-network based content retrieval is irrelevant for the system described herein.

Figure 2A:
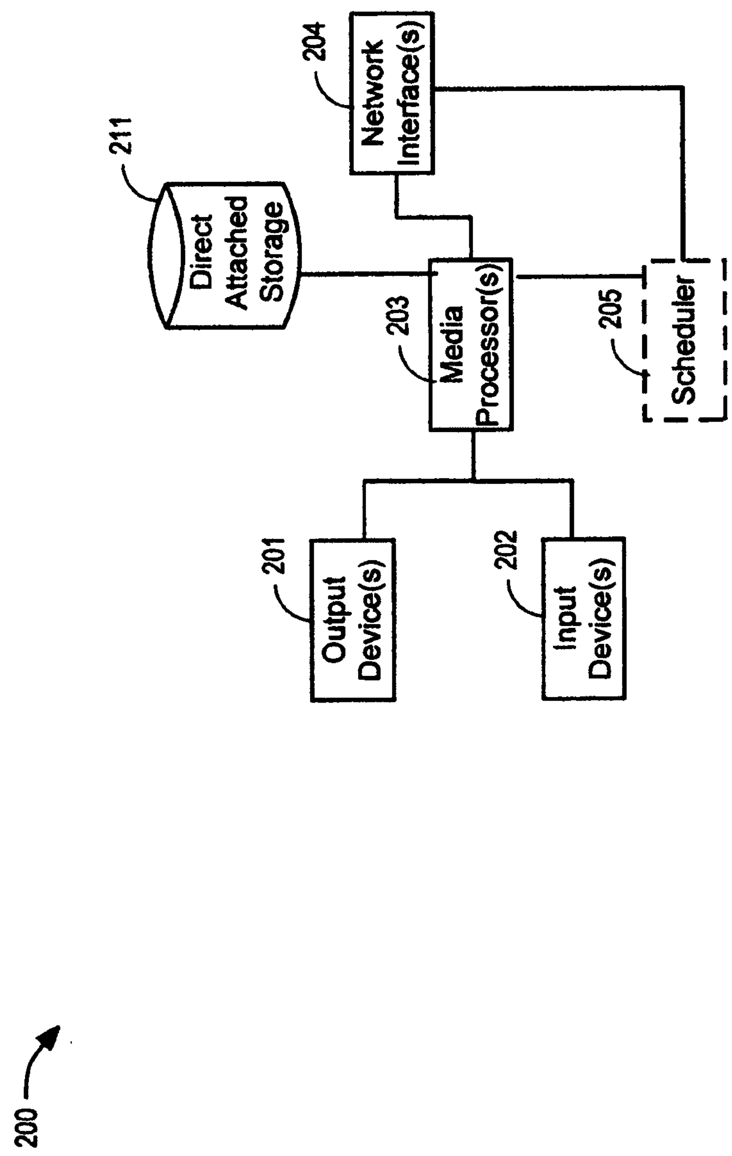
FIG. 2A is a block diagram of an example of a self-contained system for playback of rich media content retrieved from a content repository.

FIG. 2A is a block diagram of an example of a self-contained system for playback of rich media content retrieved from a content repository. System 200 allows a user to decode content that is stored in direct attached storage 211 using one or more media processors 203 and output the decoded content to one or more output devices 201. Selection of content by the user is performed by interaction through one or more input devices 202. Content is retrieved from the content repository through one or more network interfaces 204. In some implementations, where the content stored in direct attached storage 211 contains video or digital image elements, the output device(s) 201 will include a monitor, television or similar device capable of rendering video content for a user. In some implementations, where the content stored in direct attached storage 211, contains audio elements, the output device(s) 201 will include speakers, headphones or a similar device capable of playing audio content for a user. In some implementations, network interfaces 204 can include cable television decoders, satellite signal processors, or any other device which is capable of connecting to an open or closed broadcast network such as those provided by cable, satellite and other commercial television and radio providers. In some implementations, network interfaces 204 can include network interface cards, wireless network cards or other devices that allow connect to an open or closed point to point network such as the Internet or a private network where the device has a unique, defined address within a larger address space.

Users select content that is stored in the direct attached storage 211 by means of one or more input devices 202. Once the user selection is made through the input device(s) 202, the media processor(s) 203 will decode the content and send the decoded signal to the output device(s) 201. In some implementations, input devices can include a handheld remote control. In some implementations, an input device 202 can include a keyboard, mouse, touch-screen, input pad or any other device commonly attached to a PC. In some implementations, the input device 202 is connected virtually through an intermediary service and the users interactions with this intermediary service are recorded as user inputs. Examples of these implementations include a user providing inputs to a web browser window, tablet computer program, smart phone app or other device or program which then forwards the user's instructions to the media player 200.

In some implementations, a scheduler 205 can trigger the storage of content into direct attached storage 211 in addition to any selections made by the user in real-time using input device(s) 202. In some implementations, the scheduler 205 can be programmed by using the input device(s) 202. In some implementations, a scheduler 205 can download a schedule or available schedule selections using one or more network interfaces 204. In some implementations, the scheduler 205 can be programmed to use specific time and channel data in order to initiate storage of content. In some implementations, the scheduler 205 can be programmed to use data or metadata related to the content (e.g., program data, show titles, similarity to other shows that the user has selected) to initiate storage of content.

Figure 2B:
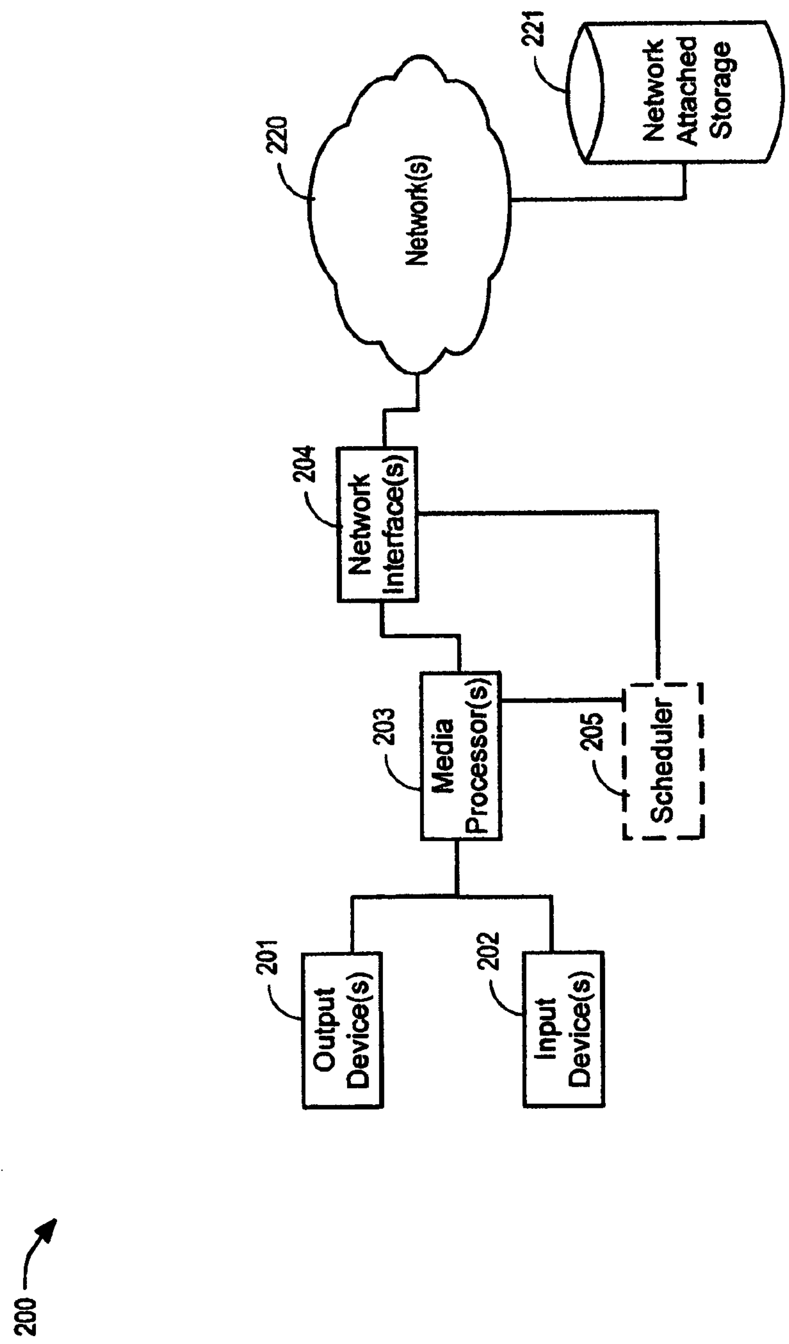
FIG. 2B is a block diagram of an example of a system for playback of rich media content retrieved from a content repository where the persistent storage of rich media content is stored on a network attached storage device.

FIG. 2B is a block diagram of an example of a system for playback of rich media content retrieved from a content repository where the persistent storage of rich media content is stored on a network attached storage device. FIG. 2B represents a system with elements common to the system represented in FIG. 2A which have been specified in connection with that description. Unless otherwise noted, the functions of the parts described in FIG. 2A will apply to the functions of the parts described in FIG. 2B where the label numbers of the parts are shared between the two diagrams.

System 200 allows a user to decode content that is stored in network attached storage 221 using one or more media processors 203 and output the decoded content to one or more output devices 201. Network attached storage 221 is a device or devices accessible over one or more networks 220 through one or more network interfaces 204 and where the content will be stored for later access. In some implementations, where the content stored in network attached storage 221 contains video or digital image elements, the output device(s) 201 will include a monitor, television or similar device capable of rendering video content for a user. In some implementations, where the content stored in the network attached storage 221, contains audio elements, the output device(s) 201 will include speakers, headphones or a similar device capable of playing audio content for a user.

Users select content that is stored in the network attached storage 221 by means of one or more input devices 202.

In some implementations, a scheduler 205 can trigger the storage of content into network attached storage 221 in addition to any selections made by the user in real-time using input device(s) 202.

Figure 2C:
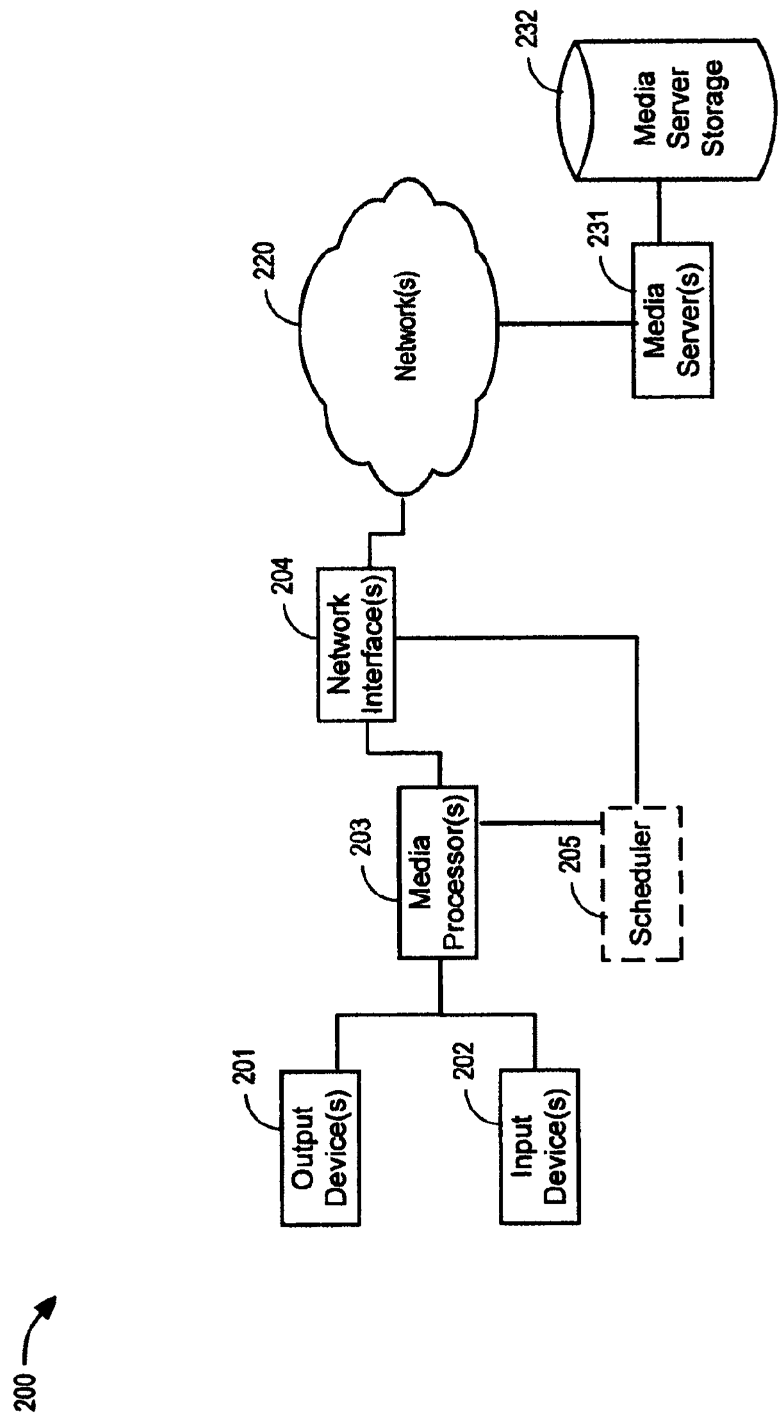
FIG. 2C is a block diagram of an example of a system for playback of rich media content retrieved from a content repository where the persistent storage of rich media content is stored on a storage device attached to a remove media server.

FIG. 2C is a block diagram of an example of a system for playback of rich media content retrieved from a content repository where the persistent storage of rich media content is stored on a storage device attached to a remove media server. FIG. 2C represents a system with elements common to the system represented in FIG. 2A which have been specified in connection with that description. Unless otherwise noted, the functions of the parts described in FIG. 2A will apply to the functions of the parts described in FIG. 2C where the label numbers of the parts are shared between the two diagrams.

System 200 allows a user to decode content that is stored in media server storage 232 which is accessed by communicating with one or more media servers 231 over one or more networks 220 by using one or more media processors 203. As content is decoded, it is output to one or more output devices 201. A media server 231 is a system that allows rich media content to be stored and later retrieved by one or more media processors 203 over at least one network 220. In some implementations, where the content stored in the media server storage 232 contains video or digital image elements, the output device(s) 201 will include a monitor, television or similar device capable of rendering video content for a user. In some implementations, where the content stored in the media server storage 232, contains audio elements, the output device(s) 201 will include speakers, headphones or a similar device capable of playing audio content for a user.

Users select content that is stored in the media server storage 232 by means of one or more input devices 202.

In some implementations, a scheduler 205 can trigger the storage of content into media server storage 232 in addition to any selections made by the user in real-time using input device(s) 202. In these implementations, the scheduler 205 will send instructions to the media server 231 over one or more networks 220 which result in the media server 231 initiating the storage of selected content.

Figure 2D:
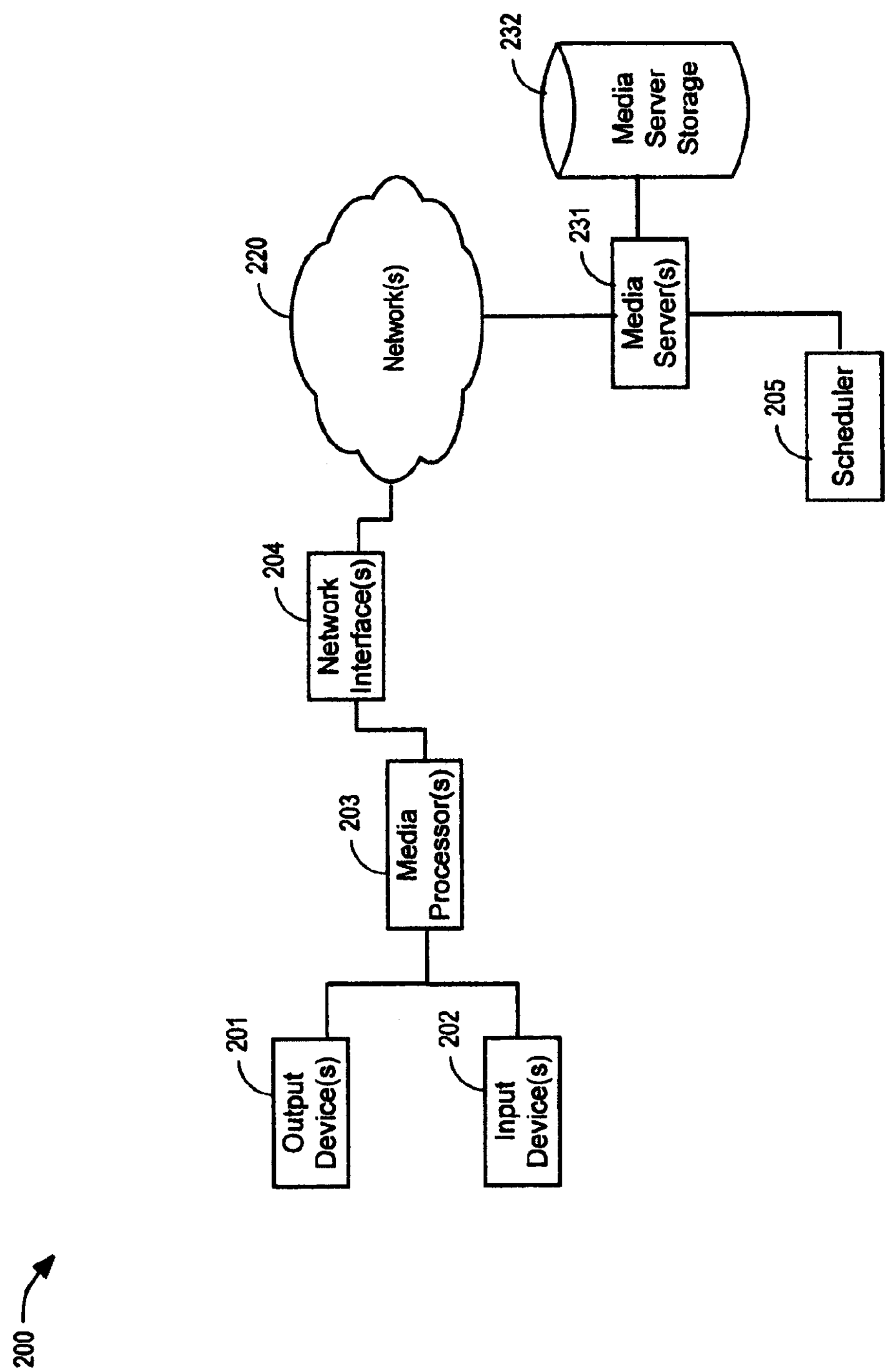
FIG. 2D is a block diagram of an example of a system for playback of rich media content retrieved from a content repository where the persistent storage of rich media content is stored on a storage device attached to a remote media server and where the scheduling function is managed by the remote media server.

FIG. 2D is a block diagram of an example of a system for playback of rich media content retrieved from a content repository where the persistent storage of rich media content is stored on a storage device attached to a remote media server and where the scheduling function is managed by the remote media server. FIG. 2D represents a system with elements common to the system represented in FIG. 2C which have been specified in connection with that description. Unless otherwise noted, the functions of the parts described in FIG.

2C will apply to the functions of the parts described in FIG. 2D where the label numbers of the parts are shared between the two diagrams.

A scheduler 205 can trigger the storage of content into media attached storage 232 in addition to any selections made by the user in real-time using input device(s) 202. In some implementations, a scheduler 205 can store aggregate storage requests for multiple users and media processors so that the same content in only stored once globally rather than once per request.

Figure 3A:
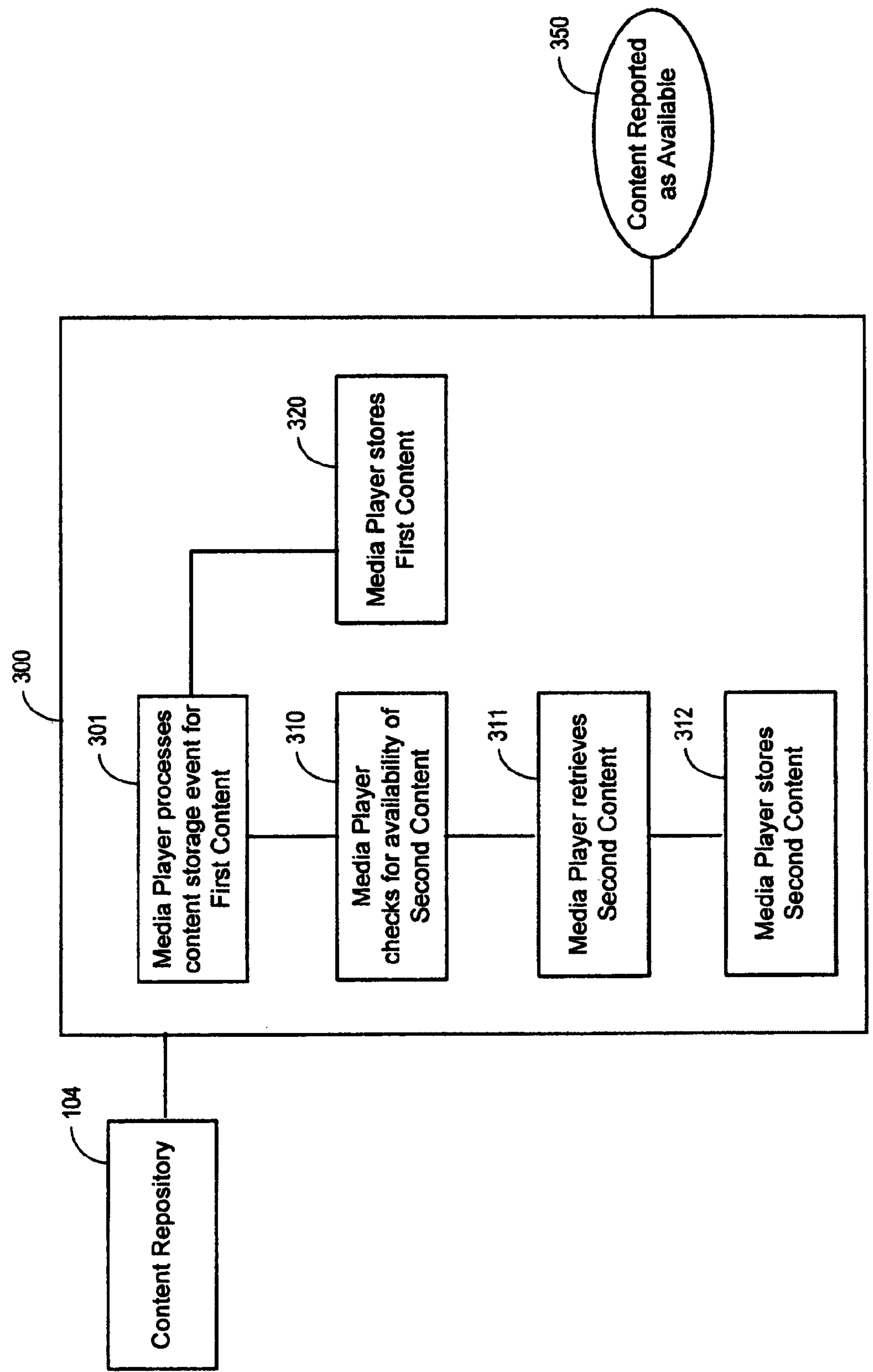
FIG. 3A is a block diagram that describes an example process for storage of both first content and second content triggered on the generation of a content storage event for first content.
Figure 3B:
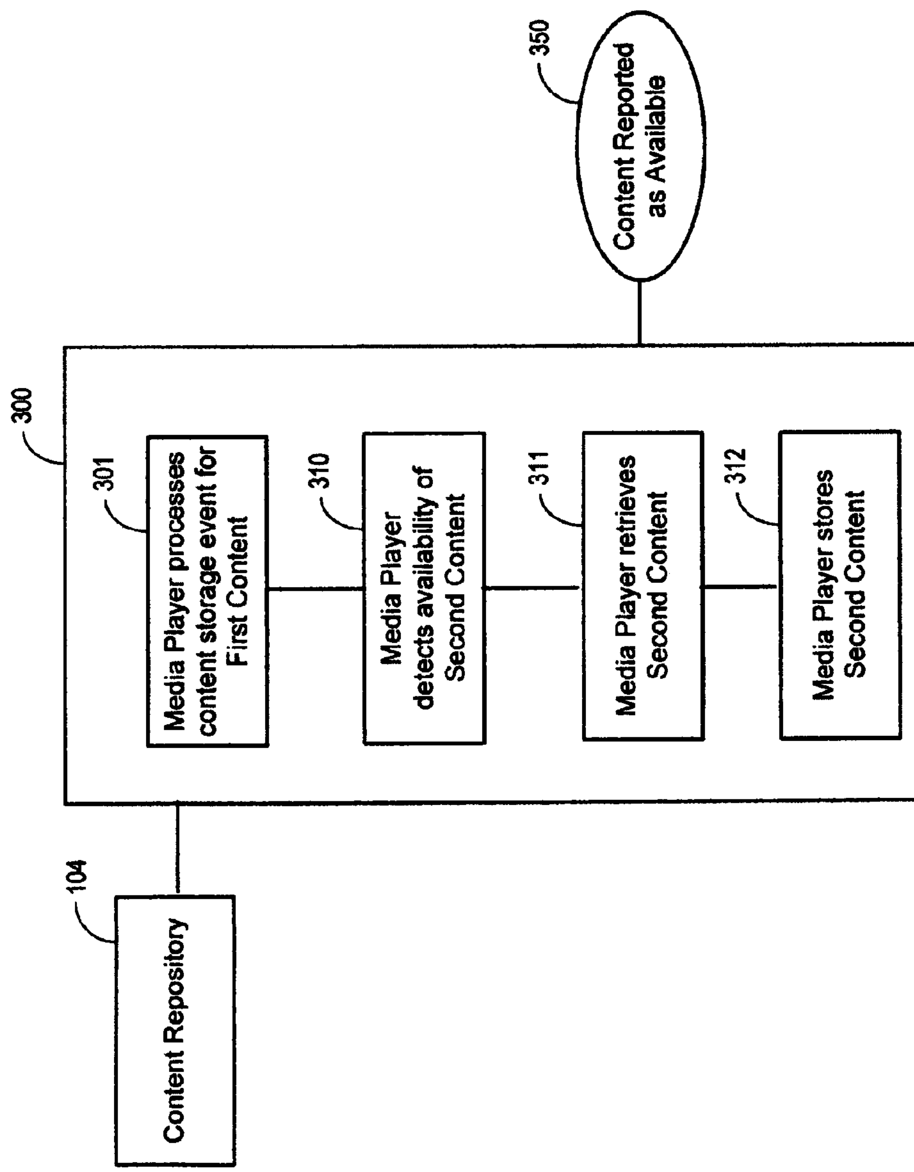
FIG. 3B is a block diagram that describes an example process for storage of second content at the exclusion of storage of first content triggered on the generation of a content storage event for first content.
Figure 3C:
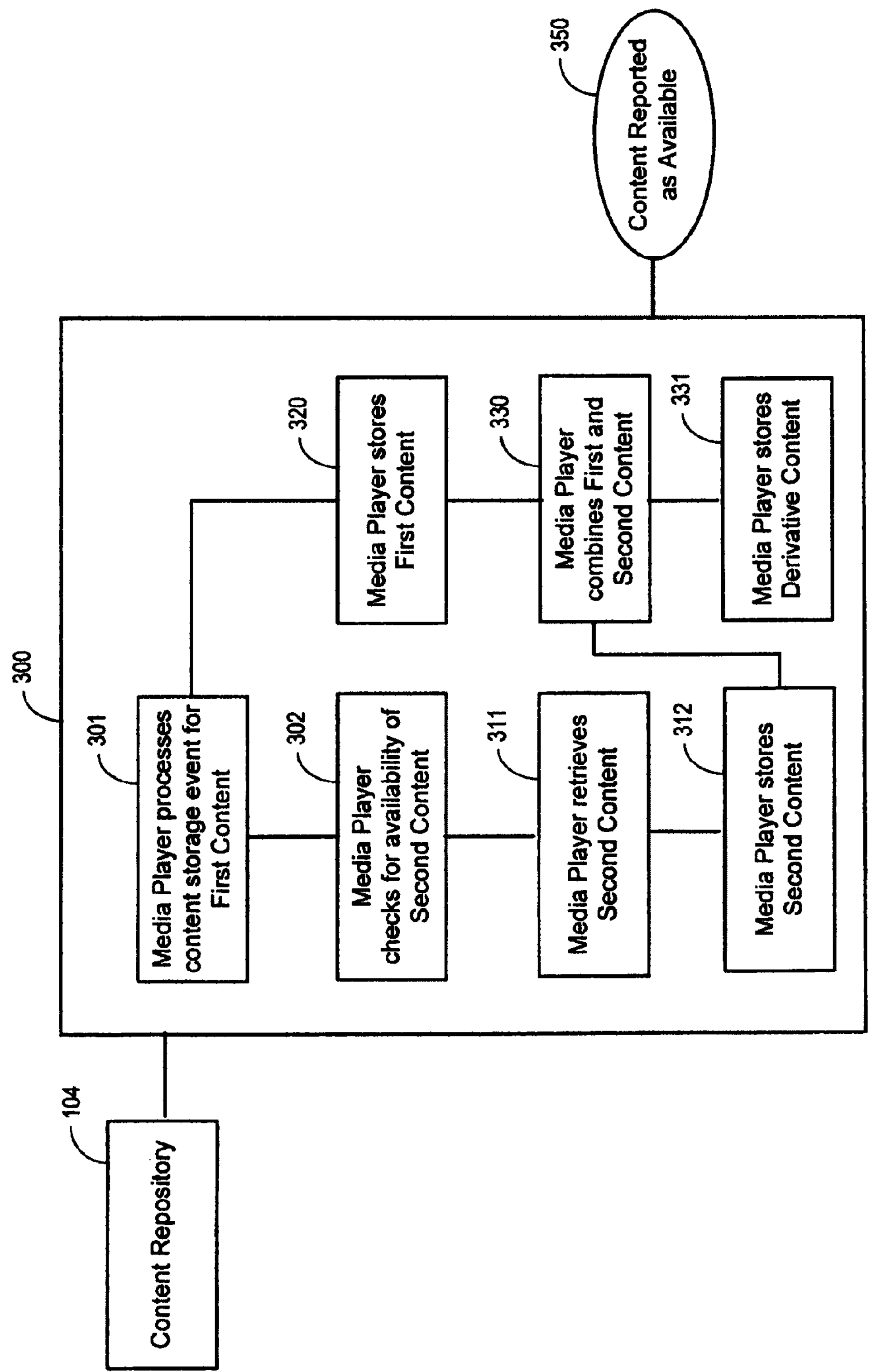
FIG. 3C is a block diagram that describes an example process for storage of content derived from both first content and second content triggered on the generation of a content storage event for first content.

FIGS. 3A-3C are block diagrams that describe example processes for storage of content triggered on the generation of a content storage event for first content. A content storage event can be an event on the system that occurs in response to either 1) the selection of content to be stored by the user, 2) the selection of content to be stored based upon a schedule within a scheduler or 3) an internal signal of the system that indicates that first content is being retrieved and which is processed on the system to cause content to be stored. Each of the example systems will store content from the content repository and report the availability of the content to the user once content has been stored. Once the content's availability has been reported to the user, the user may then select the content using a media player such as one of the systems described in FIGS. 2A-2D.

FIG. 3A is a block diagram that describes an example process for storage of both first content and second content triggered on the generation of a content storage event for first content. System 300 retrieves first content and second content from the content repository 104 and reports the content as available 350. Once content is available, the user may select the content for playback. When a content storage event for first content happens, the media player will process the content storage event for the first content 301. Processing the content storage event will cause the media player to store the first content 320. Processing the content storage event will also cause the media player to check for the availability of second content 310.

A check for the availability of second content 310 involves querying a credible data source to determine what second content may be available and where it can be located. In some implementations, the check for the availability of second content 310 can be a query from a cached data source (e.g., program guide, TV schedule or list of available selections) that has been downloaded or cached locally to the media player. In some implementations, the check for the availability of second content 310 can be a query that is made over a network and where the presence and location of second content is provided to the media player in real time. In checking for availability of second content, details about the first content will be used to form the basis of a query. In some implementations, the details about the first content will be data or metadata of the content (e.g., the title, episode number, etc). In some implementations, the details about the first content will be data or metadata of the content context (e.g., the time it is playing, its length, the channel it is playing on).

In some implementations, the storage of the first content 320 can happen concurrently (i.e., in parallel) with the check for availability of second content 310. In some implementations, the storage of the first content 320 can happen serially with the check for availability of second content 310 and where the execution of either step can occur in any order.

In some implementations, the check for availability of second content 310 may include additional metadata to allow the second content to be customized for the user. Examples of these implementations include providing data that is sufficient to allow the dynamic insertion of interstitial advertising into the content to ensure that ads targeted to the user. In some implementations, the check for availability of second content 310 may include authentication details (e.g., username, device ID or subscription key).

Once the second content is identified, the media player retrieves the second content 311 using the method that is appropriate for the content repository containing the second content (e.g., by downloading from a website, streaming from a server or recording from a broadcast). When the media player retrieves the second content 311, it will store the second content 312 in a data store.

As the first content and second content become available, each will be reported as available 350. In some implementations, the media player will report the availability a content 312 when any part of it is available. In some implementations, the media player will report the availability of content 312 only once it has been stored in its entirety.

FIG. 3B is a block diagram that describes an example process for storage of second content at the exclusion of storage of first content triggered on the generation of a content storage event for first content. FIG. 3B represents a system with elements common to the system represented in FIG. 3A which have been specified in connection with that description. Unless otherwise noted, the functions of the parts described in FIG. 3A will apply to the functions of the parts described in FIG. 3B where the label numbers of the parts are shared between the two diagrams.

System 300 will detect availability of second content 310 and if second content is available will cause the first content to not be reported as available to the user. In some implementations, the first content will not be stored. In some implementations, the first content will be stored but is not reported as available to the user. In some implementations, the user will be aware that the second content supersedes the first content. In some implementations, the second content will completely supersede the first content and the user will have no indication of the second content superseding the first content.

FIG. 3C is a block diagram that describes an example process for storage of content derived from both first content and second content triggered on the generation of a content storage event for first content. FIG. 3C represents a system with elements common to the system represented in FIG. 3A which have been specified in connection with that description. Unless otherwise noted, the functions of the parts described in FIG. 3A will apply to the functions of the parts described in FIG. 3C where the label numbers of the parts are shared between the two diagrams.

Once system 300 stores the first content 320 and stores the second content 312, the content can be dynamically combined into a single, derivative content 330 and the derivative content is stored 331. In some implementations, the media player can begin the process of combining the content before the first content or second content is completely stored. In some implementations, the derivative content will be the result of combining deleted scenes or other extended content that is represented in the second content with the first content so that story continuity is preserved (e.g., place the deleted scene back into the first content at the point that it was removed or add outtakes to the end of a show after the credits are complete). In some implementations, sections of the first content may be replaced with equivalent components from the second content (e.g., replacing a scene where profanities were removed for television audiences with one where the profanities are still present, replacing the credits at the end of a movie with a version that has not been letterboxed).

In some implementations, the first content or second content will not be reported as available to the user (i.e., the only content that can be selected for playback will be the derivative content). In some implementations, the user will be aware that the derivative content supersedes the first content. In some implementations, the derivative content will completely supersede the first content and the user will have no indication of the derivative content superseding the first content.

Figure 4:
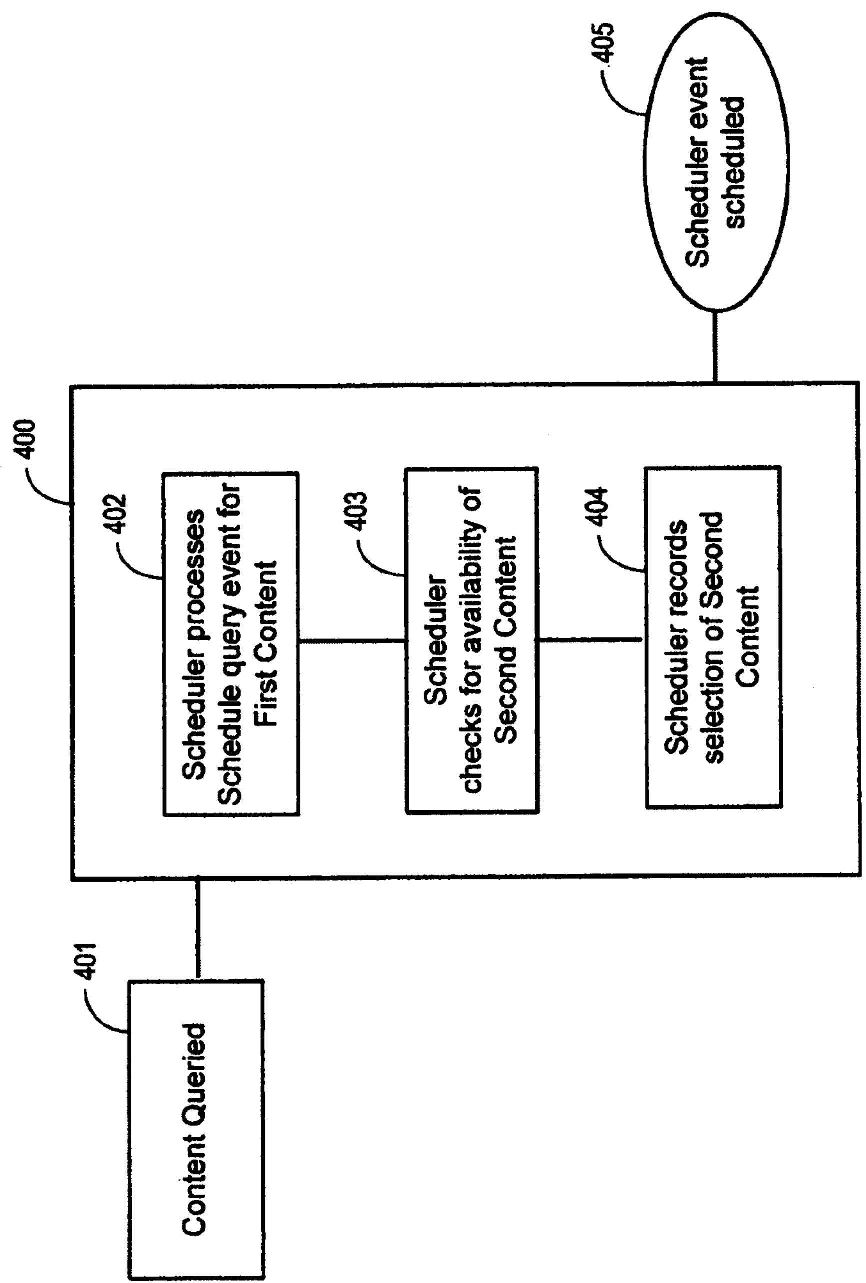
FIG. 4 is a block diagram that describes an example process for scheduling a content storage event for second content at the time that a content storage event for first content is scheduled.

FIG. 4 is a block diagram that describes an example process for scheduling a content storage event for second content at the time that a content storage event for first content is scheduled. System 400 schedules a content storage event for second content when the content query 401 that is used to schedule a content storage event for first content is processed. The content query 401 contains selection criteria that identify a first content selection from a user. Based on the content query 401, first content is selected and a content storage event for first content can be created. Once the first content is selected, a check for the availability of second content occurs 403. When second content is present, the second content will be selected 404. Once selected a content storage event is scheduled for the second content 405.

In some implementations the system will use a subsystem such as the one described in 400 in order to provide asynchronous functionality for subsystems such as those described in FIGS. 3A-3C. In these implementations, redundant steps can be removed (i.e., a check for the availability of second content only happens once). In some implementations, subsystems such as those described FIGS. 3A-3C will retrieve or store second content based on a content storage event for second content (generated in response to a check for content availability) rather than directly due to the check for content availability.

In some implementations, the content storage event for second content is scheduled immediately. In some implementations, the content storage event for second content is scheduled for a time in the future.

Figure 5:
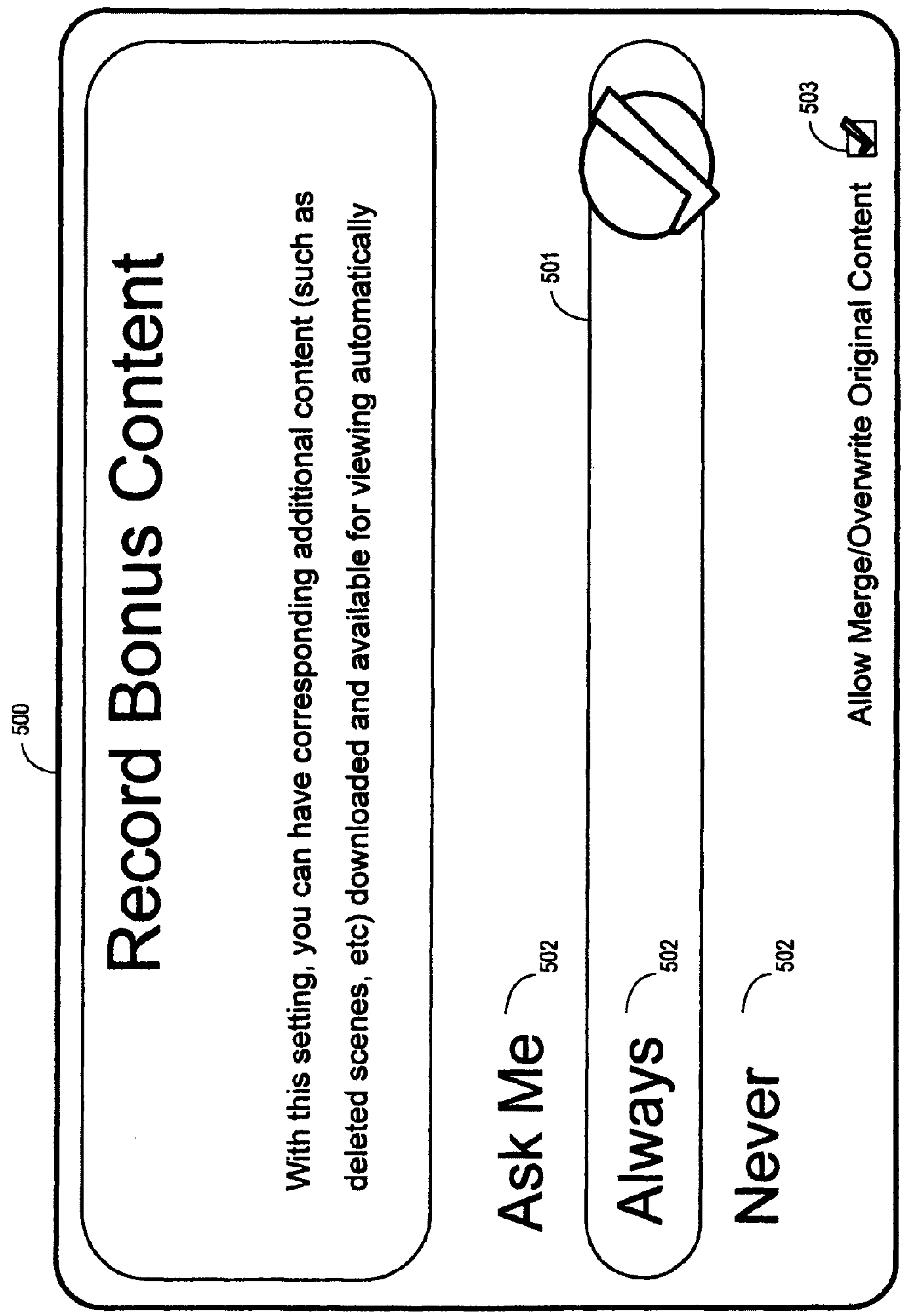
FIG. 5 shows an exemplary settings interface permitting a user to select a preference for how selected content will be retrieved and stored.

FIG. 5 shows an exemplary settings interface 500 permitting a user to select a preference for how selected content will be retrieved and stored. Using a selection control 501, the user can select an option from a list of options 502 that represents the user's preference for retrieving second content.

In some implementations, the list of options 502 will allow a user to select whether second content will always or never be downloaded. In some implementations, the list of options 502 will include a control that requires the user to be prompted for confirmation before the second content is retrieved from the content repository.

In some implementations, the user can select with a control 503 whether the first content can be overwritten or replaced with the second content. In some implementations, the user can select with a control 503 whether the first content and second content can be merged to produce derivative content.

When options are selected by a user (e.g., 501 or 503), the system records the selection by the user.

Figure 6A:
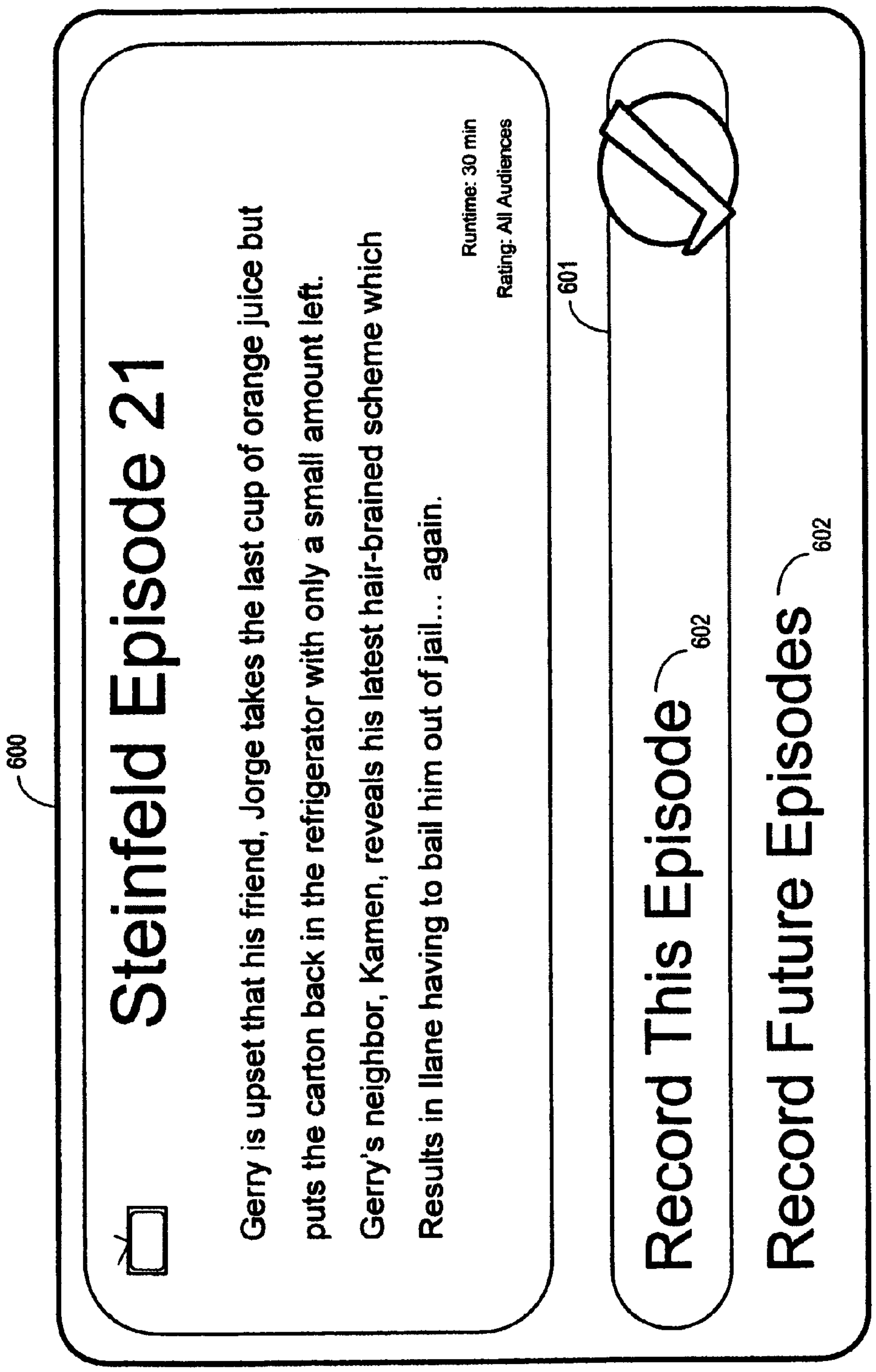
FIG. 6A shows an exemplary scheduling interface that allows a user to select with a control 601 their preference for recording first content based on the data or metadata associated with the first content.
Figure 6B:
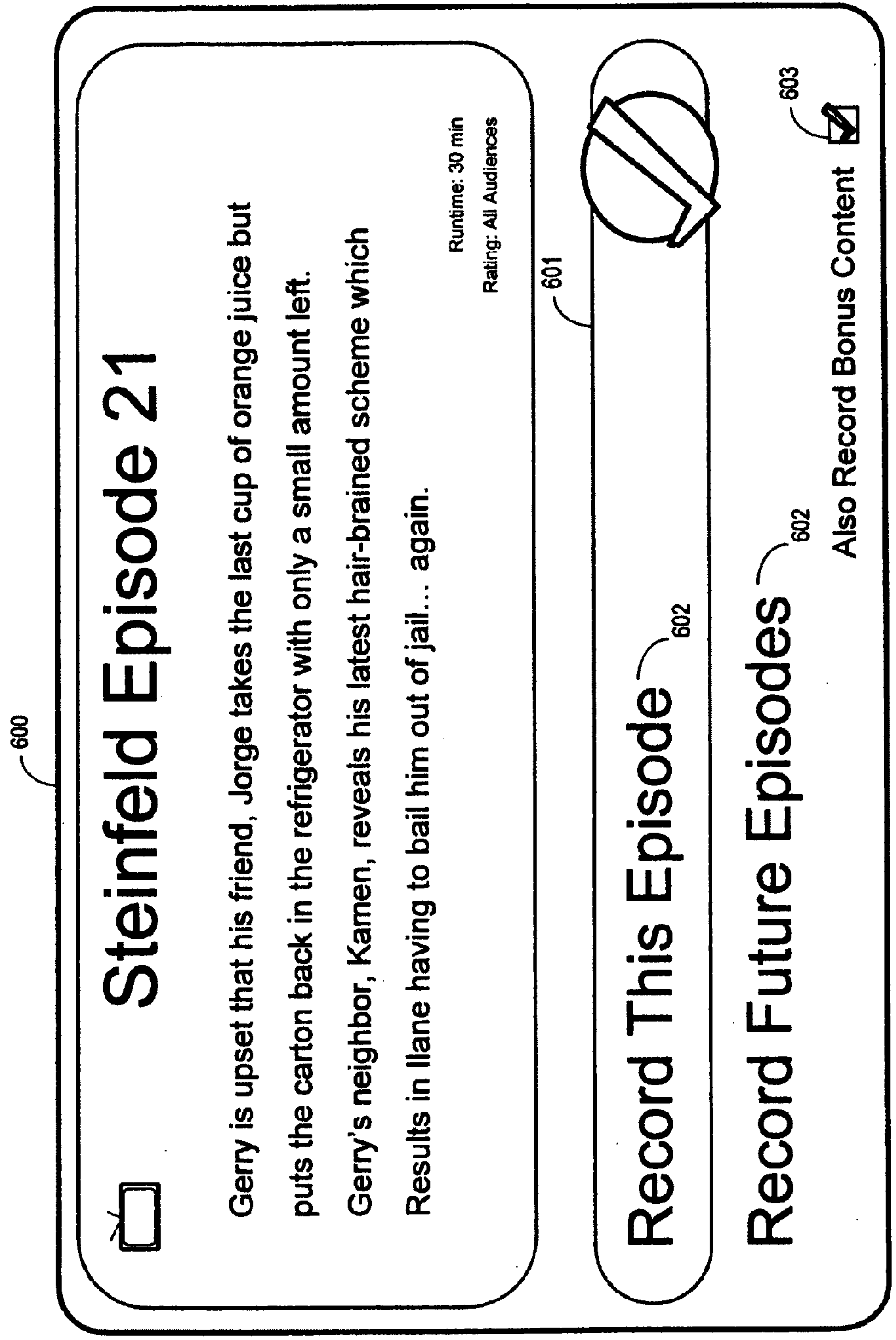
FIG. 6B shows an exemplary scheduling interface that allows a user to select with a control 601 their preference for recording first content based on the data or metadata associated with the first content and to provide a secondary selection for recording second content associated with the first content.

FIGS. 6A-6B show exemplary scheduling interfaces that allow a user to schedule a content storage event in the future based on data or metadata about the first content. FIG. 6A shows an exemplary scheduling interface 600 that allows a user to select with a control 601 their preference for recording first content based on the data or metadata associated with the first content.

In some implementations, a user is presented with a list of options 602 for recording first content that occurs in the future. In some implementations, the list of options includes an option to select the content currently selected in the interface (e.g., the current episode, next showing, etc). In some implementations, the list of options 602 includes an option to select a plurality of first content based upon the membership of the first content within a larger grouping (e.g., all episodes in a season of television programming, all movies starring a particular actor, or all music from a particular band or album).

FIG. 6B shows an exemplary scheduling interface 600 that allows a user to select with a control 601 their preference for recording first content based on the data or metadata associated with the first content and to provide a secondary selection for recording second content associated with the first content. FIG. 6B represents a system with elements common to the system represented in FIG. 6A which have been specified in connection with that description. Unless otherwise noted, the functions of the parts described in FIG. 6A will apply to the functions of the parts described in FIG. 6B where the label numbers of the parts are shared between the two diagrams.

In some implementations, the user can select a control 603 to allow or disallow the recording of second content that is related to the selected first content. In some implementations, second content is not retrieved unless the selection of control 603 has been recorded by the system.

Figure 7A:
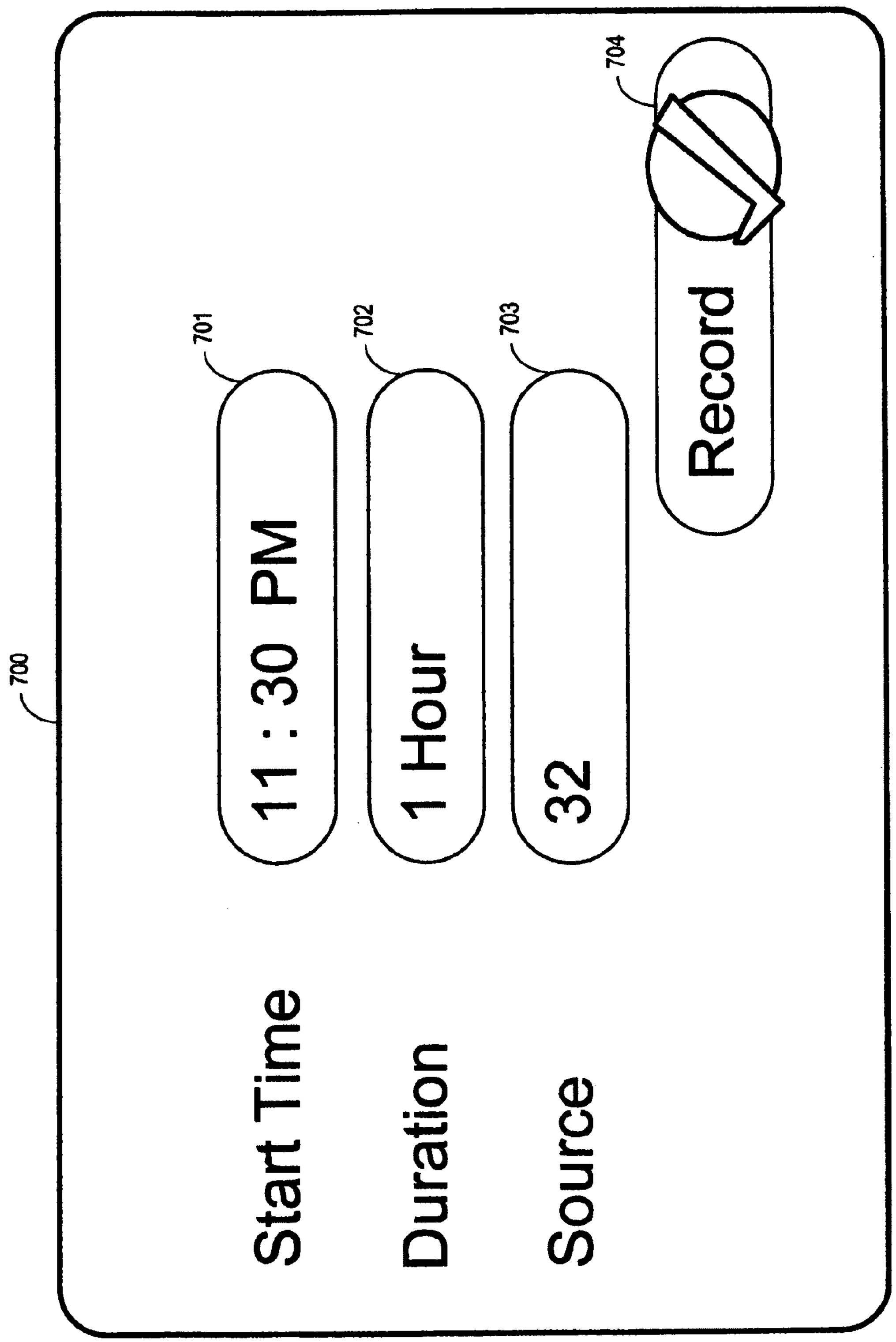
FIG. 7A shows an exemplary scheduling interface that allows a user to select with schedule controls their preference for recording first content based on the schedule and location data associated with the first content.
Figure 7B:
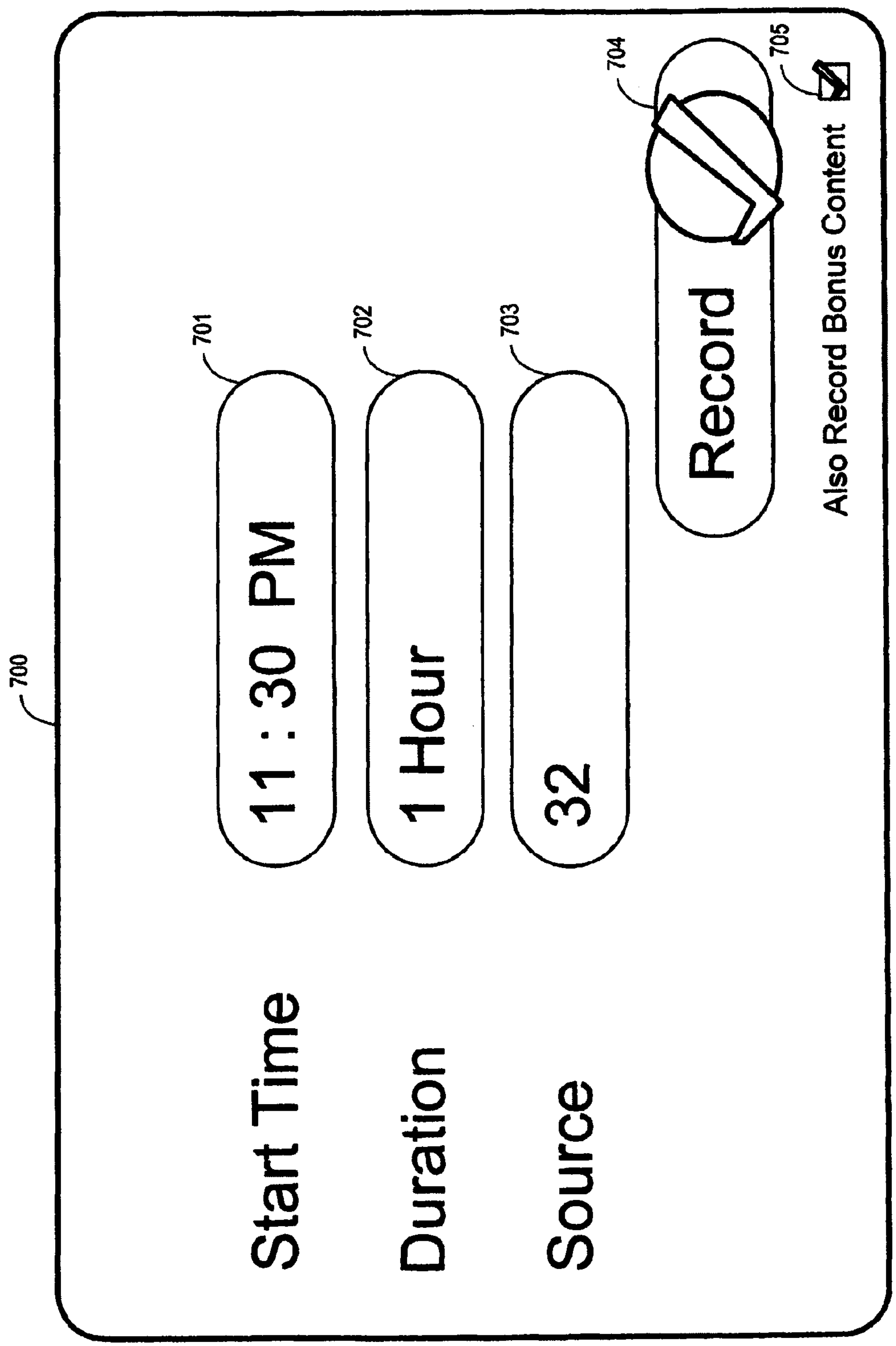
FIG. 7B shows an exemplary scheduling interface that allows a user to select with schedule controls their preference for recording first content based on the schedule and location data associated with the first content and to provide a secondary selection for recording second content associated with the first content.

FIGS. 7A-7B show exemplary scheduling interfaces that allow a user to schedule a content storage event in the future based on schedule and location data about the first content. FIG. 7A shows an exemplary scheduling interface 700 that allows a user to select with schedule controls their preference for recording first content based on the schedule and location data associated with the first content.

In some implementations, schedule controls include a start-time control 701, duration control 702 or source control 703. In some implementations, a start-time control 701 is used to identify the time at which the content retrieval will begin from the content repository.

In some implementations, the duration control 702 can be used to identify how long the content is to be retrieved. In some implementations, a duration control 702 can be used to calculate an end-time which later causes the system to process an event which will end the retrieval of the content. In some implementations, an end-time is specified rather than a duration control 702. In these implementations, the system can either calculate a duration or can schedule an event to be processed by the system to stop the retrieval of the content at a specified time.

In some implementations, a source control 703 can be used to specify a location from the content repository is located. In some implementations, a source control 703 can specify a network address, URL, stream ID, radio frequency or transmission channel.

In some implementations, a user will have an record control 704 which is selected once all of the other controls are selected. In some implementations, the selection of the other controls is recorded once the record control 704 is selected.

FIG. 7B shows an exemplary scheduling interface 700 that allows a user to select with schedule controls their preference for recording first content based on the schedule and location data associated with the first content and to provide a secondary selection for recording second content associated with the first content. FIG. 7B represents a system with elements common to the system represented in FIG. 7A which have been specified in connection with that description. Unless otherwise noted, the functions of the parts described in FIG. 7A will apply to the functions of the parts described in FIG. 7B where the label numbers of the parts are shared between the two diagrams.

In some implementations, the user can select a control 705 to allow or disallow the recording of second content that is related to the selected first content. In some implementations, second content is not retrieved unless the selection of control 705 has been recorded by the system.

Figure 8A:
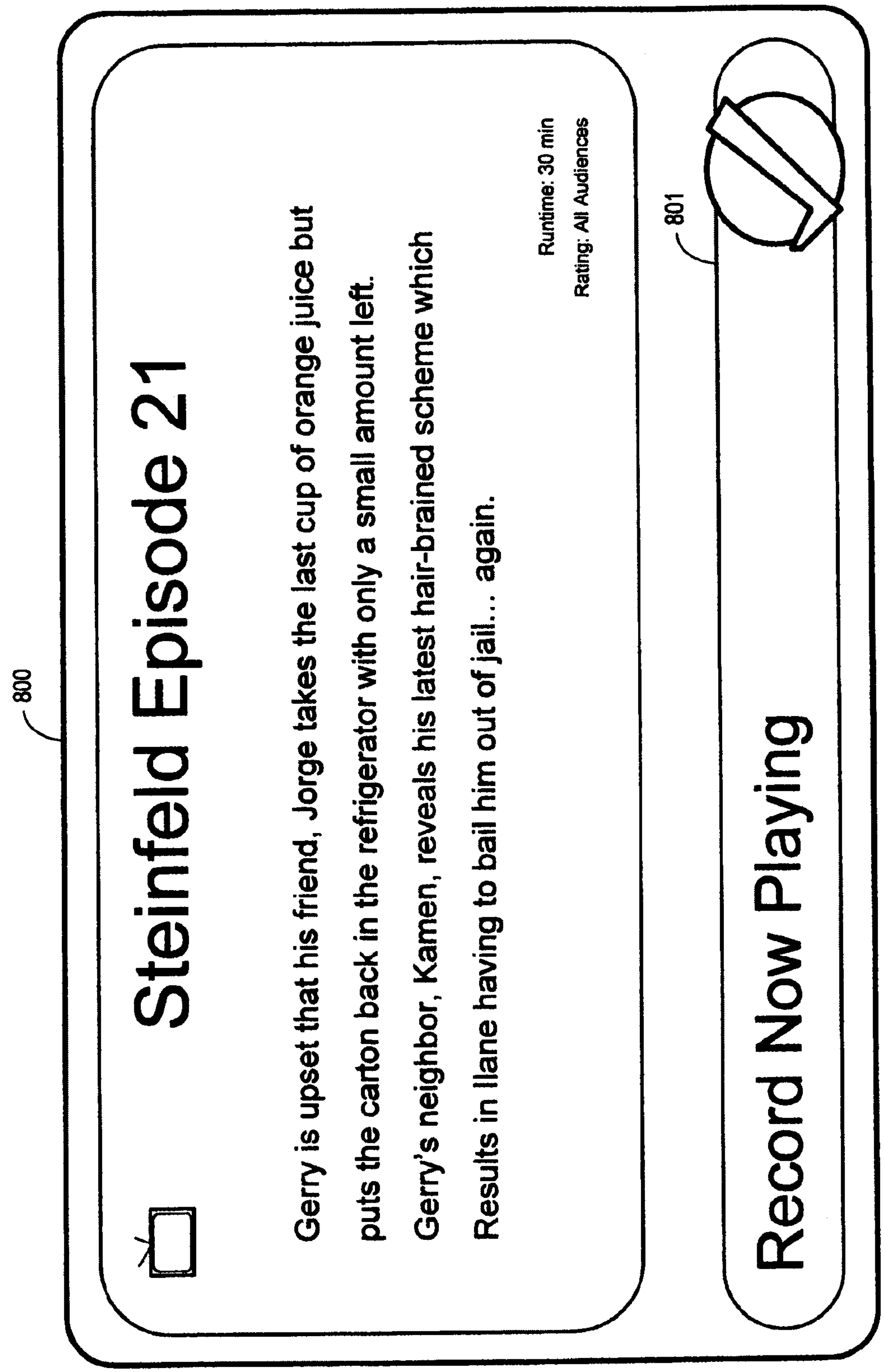
FIG. 8A shows an exemplary recording interface that allows a user to select first content based that is currently being received by the media player.
Figure 8B:
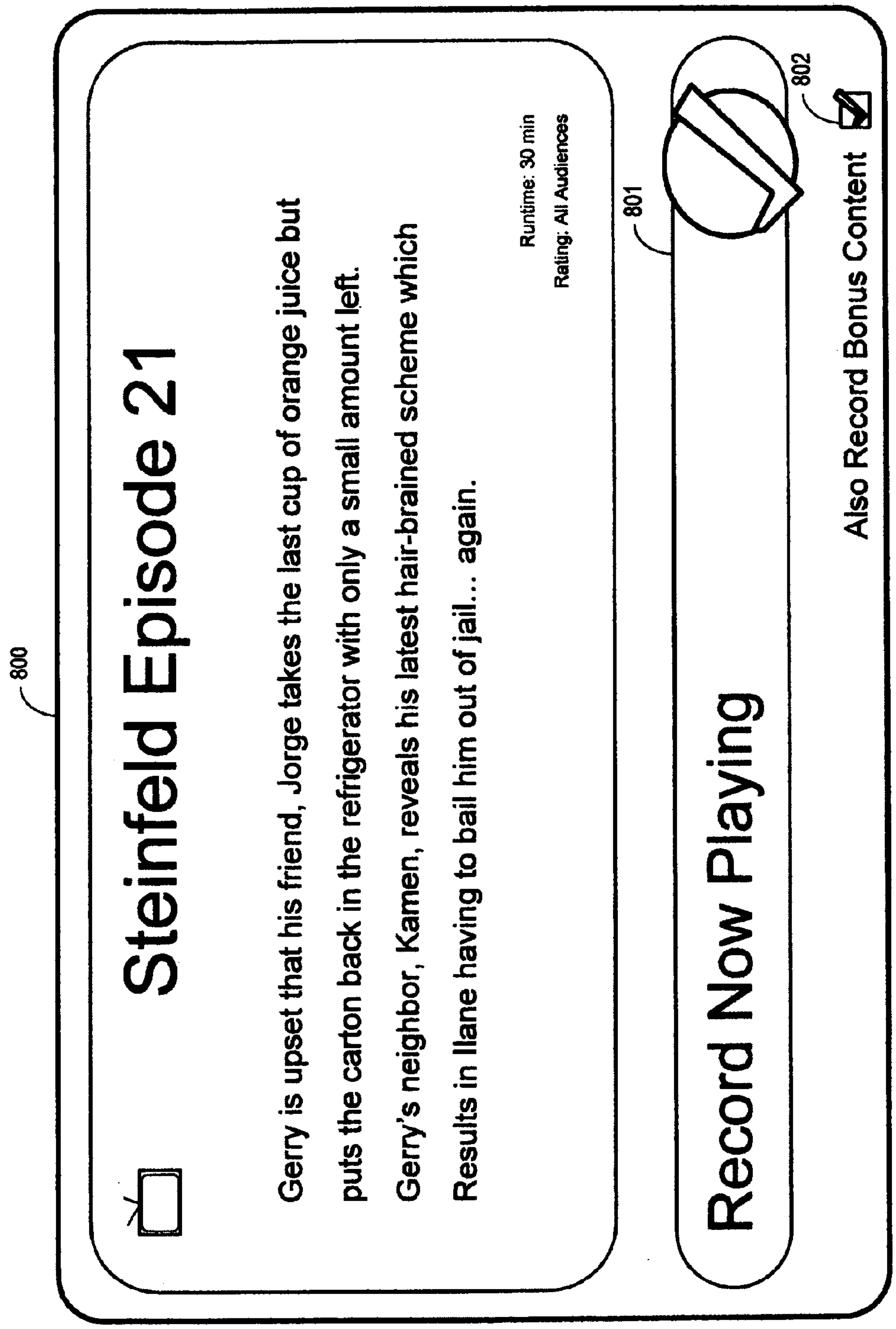
FIG. 8B shows an exemplary recording interface that allows a user to select first content based that is currently being received by the media player and to provide a secondary selection for recording second content associated with the first content.

FIGS. 8A-8B show exemplary recording interfaces that allow a user to initiate a content storage event in real time. FIG. 8A shows an exemplary recording interface 800 that allows a user to select first content based that is currently being received by the media player. A user selects the first content using a selection control 801 and the selection is recorded by the system, in turn producing a content storage event for first content.

In some implementations, second content can be selected based on data or metadata of the first content (e.g., a title, song, or episode number). In some implementations, second content can be selected based on the context data (e.g., time and channel associated with the selection).

FIG. 8B shows an exemplary recording interface 800 that allows a user to select first content based that is currently being received by the media player and to provide a secondary selection for recording second content associated with the first content. FIG. 8B represents a system with elements common to the system represented in FIG. 8A which have been specified in connection with that description. Unless otherwise noted, the functions of the parts described in FIG. 8A will apply to the functions of the parts described in FIG. 8B where the label numbers of the parts are shared between the two diagrams.

In some implementations, the user can select a control 801 to allow or disallow the recording of second content that is related to the selected first content. In some implementations, second content is not retrieved unless the selection of control 801 has been recorded by the system.

Figure 9:
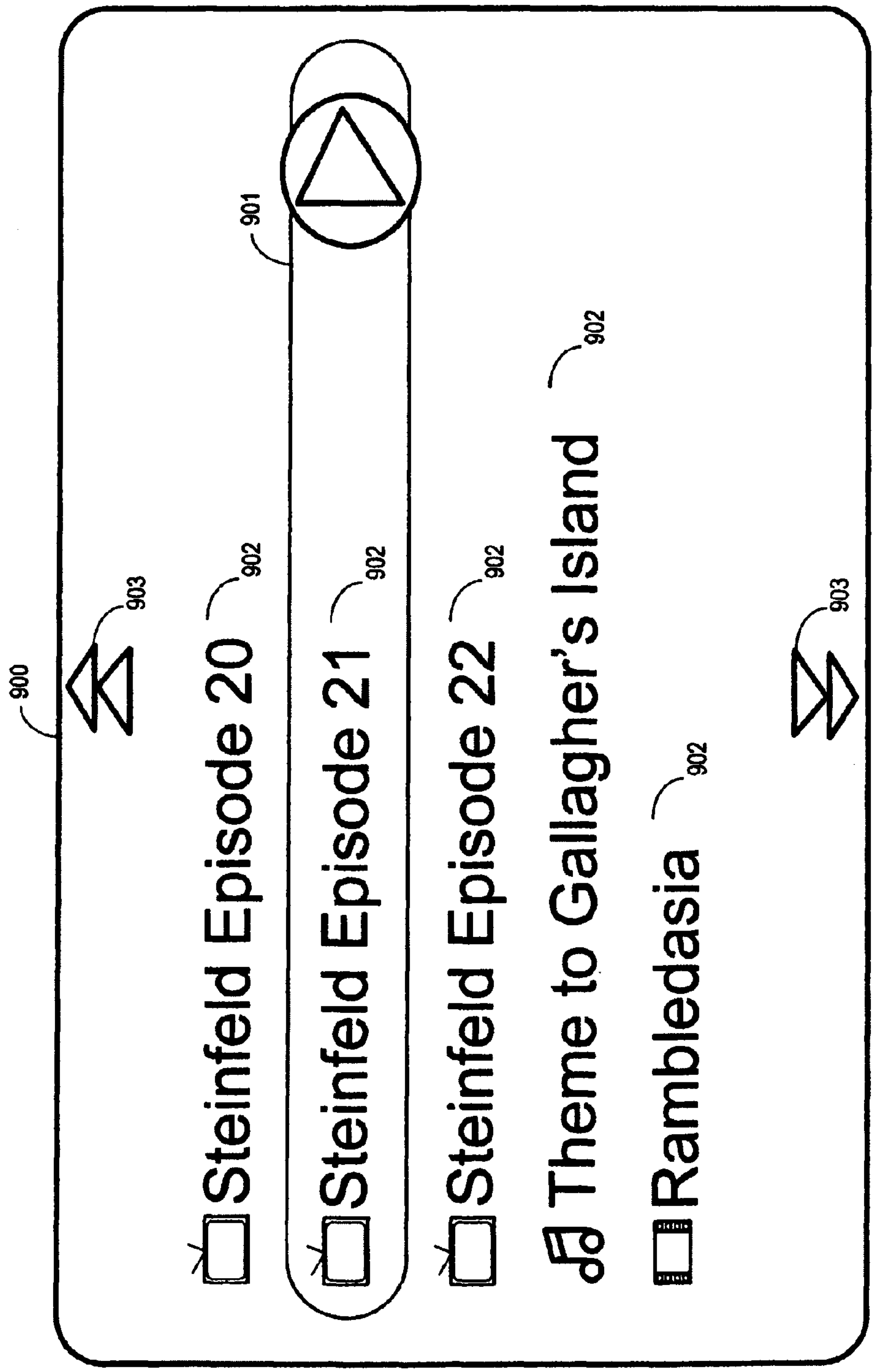
FIG. 9 shows an exemplary interface for allowing the user to select content from a plurality of content that is reported as available on the system.

FIG. 9 shows an exemplary interface 900 for allowing the user to select content from a plurality of content that is reported as available on the system. In some implementations, a user is presented with a list of content 902 from which to select specific content. In some implementations, the user selects a specific content item from the list of content 902 through the use of a selection control 901. In some implementations, the list of content may include content items that are all the same type (e.g., movies, video content, music). In some implementations, the list of content may include content of different types (e.g., movies, tv shows, radio talk shows and music together).

In some implementations, there may exist more content that can be reasonably rendered on a single screen or view. In these implementations, controls 906 may be present to allow the view of data to advance to a new set of available content.

In some implementations, the user selects the content using control 901. In some implementations, once the content is selected, the content is immediately decoded and rendered to the output device by the media processor. In other implementations, once the content is selected, further data or metadata about the content is presented to the user.

Figure 10A:
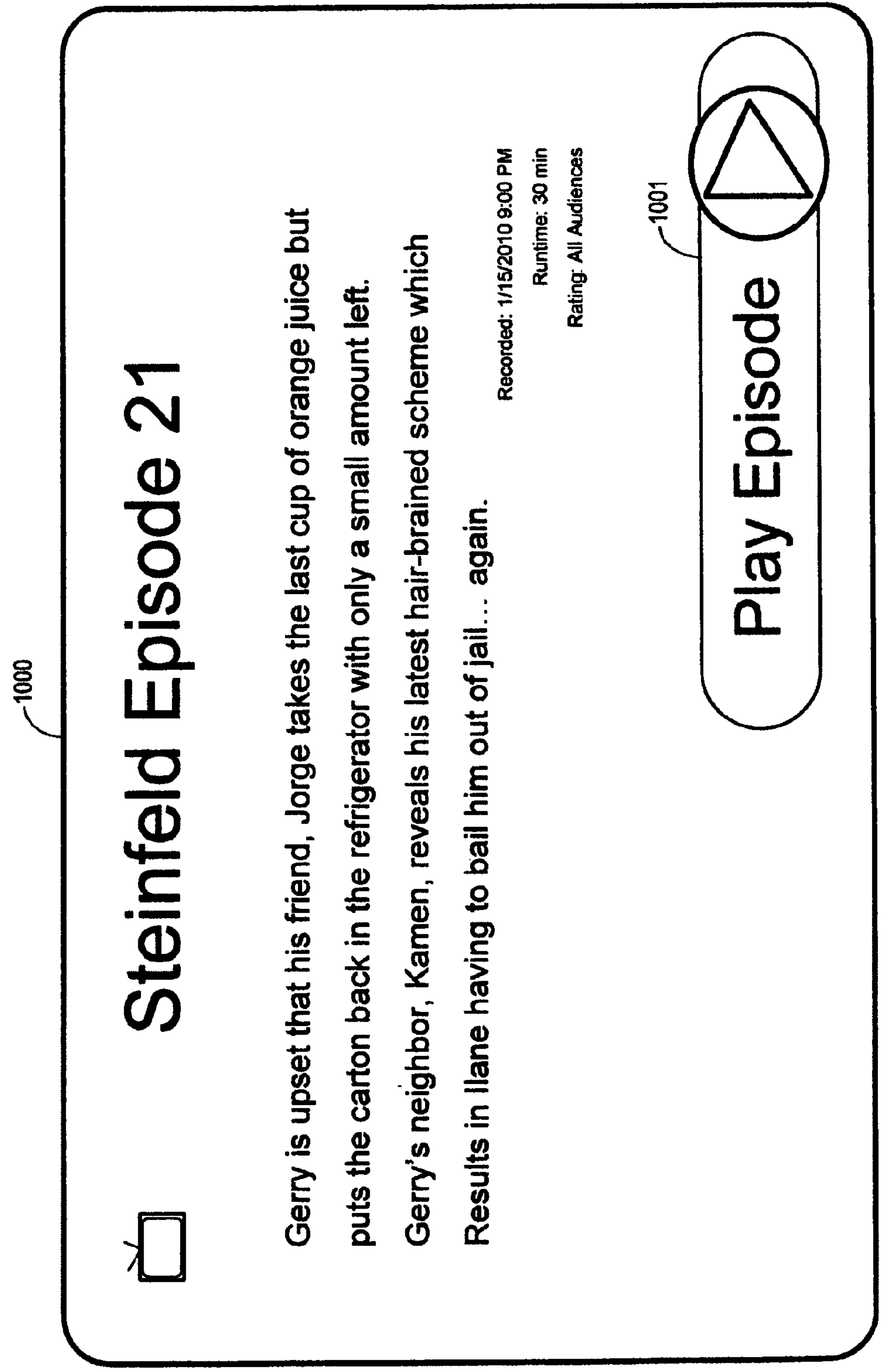
FIG. 10A shows an exemplary interface for allowing a user to view data or metadata associated with content.
Figure 10B:
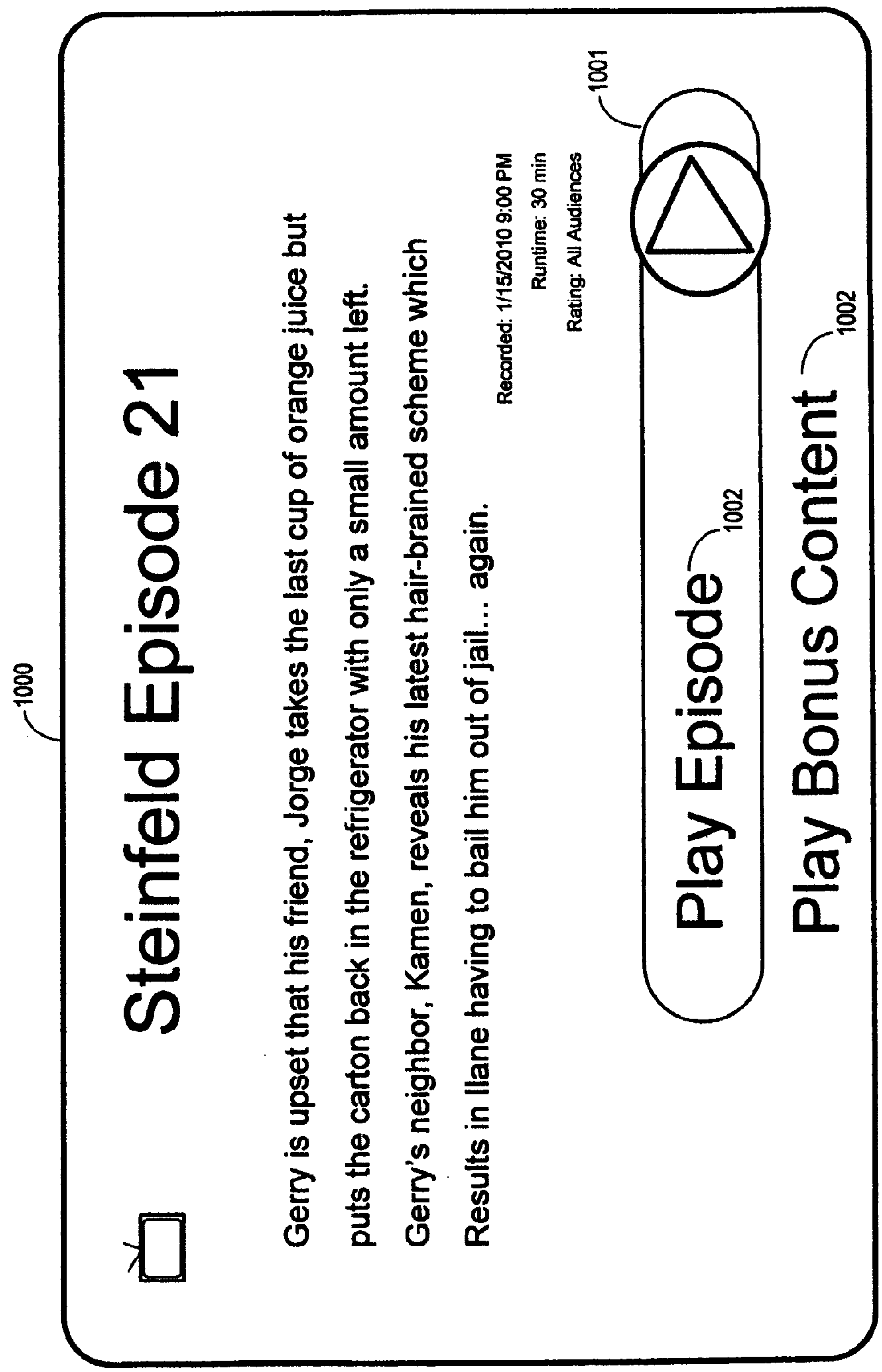
FIG. 10B shows another exemplary interface for allowing a user to view data or metadata associated with content.

FIGS. 10A-10B show exemplary interfaces that allow a user to select content for playback in the media player. FIG. 10A shows an exemplary interface 1000 for allowing a user to view data or metadata associated with content. In some implementations, the user selects the content for playback using playback control 1001. In some implementations, once the content is selected for playback, the content is rendered to the output device by the media processor.

FIG. 10B shows an exemplary interface 1000 for allowing a user to view data or metadata associated with content. FIG. 10B represents a system with elements common to the system represented in FIG. 10A which have been specified in connection with that description. Unless otherwise noted, the functions of the parts described in FIG. 10A will apply to the functions of the parts described in FIG. 10B where the label numbers of the parts are shared between the two diagrams.

In some implementations the user may be presented with a list of options for playing content representing first and second content 1002. Using a selection control 1001, the user can select either the first content or second content. In some implementations, once the user has selected content with a selection control 1001, the selected content is rendered to the output device by the media processor.

This written description uses examples to disclose the invention, including the best mode, and also to enable a person skilled in the art to make and use the invention. The patentable scope of the invention may include other examples. As a further example, the systems and methods may include data signals conveyed via networks (e.g., local area network, wide area network, Internet, combinations thereof, etc.), fiber optic media, carrier waves, wireless networks, etc. for communication with one or more data processing devices. The data signals can carry any or all of the data disclosed herein that is provided to or from a device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term “data processing apparatus” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including, by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device (e.g., a mouse or a trackball), by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication (e.g., a communication network). Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to one other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

It is claimed:

1. A computer-implemented method of providing second content to a user via retrieval from a content repository, comprising:

attempting to automatically identify second content which was not selected by the user but which is related to first content which was selected by the user;

providing a report of available content to the user, wherein the report includes one of:

an indicator associated with the first content for selection when the second content is not identified; and an indicator associated with the second content without any indicator associated with the first content when the second content is identified; and presenting the second content to the user upon selection of the indicator associated with the second content by the user.

2. The method of claim 1, wherein the first content and the second content are different versions of content that is otherwise the same.

3. The method of claim 2, wherein the differences in the versions of the content are differences in media quality.

4. The method of claim 1, wherein the second content is a higher resolution version of the first content.

5. The method of claim 1, wherein the second content is identified based on an attribute of the first content, wherein the attribute is determined based on data or metadata related to the first content.

6. The method of claim 5, wherein the data or metadata related to the first content includes a text attribute, wherein the text attribute is used to search for the second content.

7. The method of claim 6, wherein the text attribute includes a title of the first content.

8. The method of claim 1, wherein the identification of the second content occurs at a time that the first content is selected for storage by the user.

9. The method of claim 1, wherein the identification of the second content occurs at a time that the user selects the first content for viewing.

10. The method of claim 1, wherein the identification of the second content occurs asynchronously from user selection events.

11. The method of claim 1, wherein the second content is stored in a content repository that also stores the first content.

12. The method of claim 1, wherein the first content and the second content are stored in different content repositories.

13. The method of claim 1, wherein the first content is broadcast on a first television channel, and wherein the second content is broadcast on a second television channel.

14. The method of claim 1, wherein the first content is a movie, a television show, a radio talk show, or music.

15. The method of claim 1, wherein the first content is accessible via a website, a web service, a streaming server, over-the-air television, a radio station, cable television, terrestrial radio, satellite, coaxial cable, or fiber optic cable.

16. The method of claim 1, further comprising:

downloading and storing the second content to a media storage, wherein the second content is presented to the user from the media storage upon selection of the indicator associated with the second content by the user.

17. The method of claim 16, wherein the second content is downloaded to the media storage and the first content is not downloaded to the media storage.

18. The method of claim 16, wherein the media storage is a component of a digital video recorder (DVR).

19. The method of claim 1, wherein the user selected the first content using a handheld remote control.

20. The method of claim 1, wherein the indicator associated with the first content and the indicator associated with the second content are identical, such that the user has no indication of the second content superseding the first content.

21. The method of claim 1, further comprising:

displaying a program guide that includes a listing of the first content, wherein the user selects the first content via the program guide.

22. The method of claim 1, wherein the first content is identified by the user via a search for a title, an episode number, or an episode attribute of the first content.

23. A computer-implemented system for providing second content to a user via retrieval from a content repository, comprising:

one or more data processors;

a computer-readable medium encoded with instructions for commanding the one or more data processors to execute steps including:

attempting to automatically identify second content which was not selected by the user but which is related to first content which was selected by the user;

providing a report of available content to the user, wherein the report includes one of:

an indicator associated with the first content for selection when the second content is not identified; and an indicator associated with the second content without any indicator associated with the first content when the second content is identified; and presenting the second content to the user upon selection of the indicator associated with the second content by the user.

24. A non-transitory computer-readable medium encoded with instructions for commanding one or more data processors to execute steps of a method of providing second content to a user via retrieval from a content repository, the method comprising:

attempting to automatically identify second content which was not selected by the user but which is related to first content which was selected by the user;

providing a report of available content to the user, wherein the report includes one of:

an indicator associated with the first content for selection when the second content is not identified; and an indicator associated with the second content without any indicator associated with the first content when the second content is identified; and presenting the second content to the user upon selection of the indicator associated with the second content by the user.

25. The system of claim 23, wherein the first content and the second content are different versions of content that is otherwise the same.

26. The system of claim 25, wherein the differences in the versions of the content are differences in media quality.

27. The system of claim 23, wherein the second content is a higher resolution version of the first content.

28. The system of claim 23, wherein the second content is identified based on an attribute of the first content, wherein the attribute is determined based on data or metadata related to the first content.

29. The system of claim 28, wherein the data or metadata related to the first content includes a text attribute, wherein the text attribute is used to search for the second content.

30. The system of claim 29, wherein the text attribute includes a title of the first content.

31. The system of claim 23, wherein the identification of the second content occurs at a time that the first content is selected for storage by the user.

32. The system of claim 23, wherein the identification of the second content occurs at a time that the user selects the first content for viewing.

33. The system of claim 23, wherein the identification of the second content occurs asynchronously from user selection events.

34. The system of claim 23, wherein the second content is stored in a content repository that also stores the first content.

35. The system of claim 23, wherein the first content and the second content are stored in different content repositories.

36. The system of claim 23, wherein the first content is broadcast on a first television channel, and wherein the second content is broadcast on a second television channel.

37. The system of claim 23, wherein the first content is a movie, a television show, a radio talk show, or music.

38. The system of claim 23, wherein the first content is accessible via a website, a web service, a streaming server, over-the-air television, a radio station, cable television, terrestrial radio, satellite, coaxial cable, or fiber optic cable.

39. The system of claim 23, further comprising:

downloading and storing the second content to a media storage, wherein the second content is presented to the user from the media storage upon selection of the indicator associated with the second content by the user.

40. The system of claim 39, wherein the second content is downloaded to the media storage and the first content is not downloaded to the media storage.

41. The system of claim 39, wherein the media storage is a component of a digital video recorder (DVR).

42. The system of claim 23, wherein the user selected the first content using a handheld remote control.

43. The system of claim 23, wherein the indicator associated with the first content and the indicator associated with the second content are identical, such that the user has no indication of the second content superseding the first content.

44. The system of claim 23, further comprising:

displaying a program guide that includes a listing of the first content, wherein the user selects the first content via the program guide.

45. The system of claim 23, wherein the first content is identified by the user via a search for a title, an episode number, or an episode attribute of the first content.

46. The computer-readable medium of claim 24, wherein the first content and the second content are different versions of content that is otherwise the same.

47. The computer-readable medium of claim 46, wherein the differences in the versions of the content are differences in media quality.

48. The computer-readable medium of claim 24, wherein the second content is a higher resolution version of the first content.

49. The computer-readable medium of claim 24, wherein the second content is identified based on an attribute of the first content, wherein the attribute is determined based on data or metadata related to the first content.

50. The computer-readable medium of claim 49, wherein the data or metadata related to the first content includes a text attribute, wherein the text attribute is used to search for the second content.

51. The computer-readable medium of claim 50, wherein the text attribute includes a title of the first content.

52. The computer-readable medium of claim 24, wherein the identification of the second content occurs at a time that the first content is selected for storage by the user.

53. The computer-readable medium of claim 24, wherein the identification of the second content occurs at a time that the user selects the first content for viewing.

54. The computer-readable medium of claim 24, wherein the identification of the second content occurs asynchronously from user selection events.

55. The computer-readable medium of claim 24, wherein the second content is stored in a content repository that also stores the first content.

56. The computer-readable medium of claim 24, wherein the first content and the second content are stored in different content repositories.

57. The computer-readable medium of claim 24, wherein the first content is broadcast on a first television channel, and wherein the second content is broadcast on a second television channel.

58. The computer-readable medium of claim 24, wherein the first content is a movie, a television show, a radio talk show, or music.

59. The computer-readable medium of claim 24, wherein the first content is accessible via a website, a web service, a streaming server, over-the-air television, a radio station, cable television, terrestrial radio, satellite, coaxial cable, or fiber optic cable.

60. The computer-readable medium of claim 24, further comprising:

downloading and storing the second content to a media storage, wherein the second content is presented to the user from the media storage upon selection of the indicator associated with the second content by the user.

61. The computer-readable medium of claim 60, wherein the second content is downloaded to the media storage and the first content is not downloaded to the media storage.

62. The computer-readable medium of claim 60, wherein the media storage is a component of a digital video recorder (DVR).

63. The computer-readable medium of claim 24, wherein the user selected the first content using a handheld remote control.

64. The computer-readable medium of claim 24, wherein the indicator associated with the first content and the indicator associated with the second content are identical, such that the user has no indication of the second content superseding the first content.

65. The computer-readable medium of claim 24, further comprising:

displaying a program guide that includes a listing of the first content, wherein the user selects the first content via the program guide.

66. The computer-readable medium of claim 24, wherein the first content is identified by the user via a search for a title, an episode number, or an episode attribute of the first content.

* * * * *